(12) United States Patent
Partynski et al.

(10) Patent No.: US 6,694,094 B2
(45) Date of Patent: *Feb. 17, 2004

(54) DUAL BAND FRAMING RECONNAISSANCE CAMERA

(75) Inventors: Andrew J. Partynski, Crystal Lake, IL (US); Stephen R. Beran, Mt. Prospect, IL (US); Allie M. Baker, Cypress, CA (US); John Jones, Arkadelphia, AR (US); Stephan Wyatt, Crystal Lake, IL (US)

(73) Assignee: Recon/Optical, Inc., Barrington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/125,904

(22) Filed: Apr. 18, 2002

(65) Prior Publication Data

US 2003/0059214 A1 Mar. 27, 2003

Related U.S. Application Data

(63) Continuation of application No. 09/652,524, filed on Aug. 31, 2000.

(51) Int. Cl.[7] .................. G03B 39/00; H04N 7/18; H04N 9/47
(52) U.S. Cl. ............... 396/7; 396/8; 348/146
(58) Field of Search ............... 396/7, 8, 12, 13; 335/348, 144; 348/144, 145, 146, 147

(56) References Cited

U.S. PATENT DOCUMENTS

| 4,714,307 A | 12/1987 | Palmer ............... 350/1.3 |
| 5,155,597 A | 10/1992 | Lareau et al. ......... 358/213.24 |
| 5,668,593 A | 9/1997 | Lareau et al. ............ 348/146 |
| 5,692,062 A | 11/1997 | Lareau et al. ............ 382/107 |
| 5,798,786 A | 8/1998 | Lareau et al. ............ 348/144 |
| 5,806,789 A | 9/1998 | Boulware et al. ............ 244/1 |
| 5,841,574 A | 11/1998 | Willey ............... 359/351 |
| 5,925,883 A | 7/1999 | Woolaway, II ......... 250/370.08 |
| 6,130,705 A | 10/2000 | Lareau et al. ............ 348/144 |
| 6,256,057 B1 | 7/2001 | Mathews et al. ......... 348/144 |
| 6,281,970 B1 * | 8/2001 | Williams et al. ......... 356/141.4 |
| 6,320,611 B1 * | 11/2001 | Pepin ................... 348/147 |
| 6,349,114 B1 * | 2/2002 | Mory ................ 375/240.2 |
| 6,366,734 B1 | 4/2002 | Beran et al. ............ 396/8 |
| 6,374,047 B1 | 4/2002 | Beran et al. ............ 396/7 |
| 6,477,326 B1 | 11/2002 | Partynski et al. ......... 396/7 |
| 2001/0015755 A1 * | 8/2001 | Mathews et al. ......... 348/144 |
| 2003/0059214 A1 | 3/2003 | Partynski et al. |

OTHER PUBLICATIONS

Integration of the KS–147A LOROP into RF—5E, Robert L. Walke, F–5 Airborne Equipment Design, Jeffrey P. Duda, EO and Recce Systems, Northrop Corporation, SPIE vol. 561, *Airborne Reconnaissance 1X*, pp. 26–33, Aug. 1985.

The KS–147A LOROP Camera System, Obert Ostrem and John G. Hughes, Recon/Optical, Inc., SPIE vol. 561, *Airborne Reconnaissance 1X*, pp. 18–25, Aug. 1985.

(List continued on next page.)

Primary Examiner—Russell Adams
Assistant Examiner—Melissa J Koval
(74) Attorney, Agent, or Firm—McDonnell Boehnen Hulbert & Berghoff

(57) ABSTRACT

A reconnaissance camera is described which has a Cassegrain optical system forming an objective lens that directs radiation to a spectrum-dividing prism. The prism directs radiation in a portion of the electromagnetic spectrum (e.g., visible) into a first optical path having a two-dimensional image-recording medium. Radiation in a second band of the spectrum (e.g., IR or UV) is directed to a second optical path, which has a two-dimensional image-recording medium. A motor system is coupled to a camera housing that encloses the optical elements of the camera and the image recording media. The motor steps the entire camera housing about the roll axis while the image recording media are exposed to generate frames of imagery.

16 Claims, 26 Drawing Sheets

OTHER PUBLICATIONS

Image Stabilization Techniques for Long Range Reconnaissance Camera, George R. Lewis, Recon/Optical, Inc., pp. 1–6, Jul. 1980.

The KS–146A LOROP Camera System, Thomas Augustyn, Recon/Optical, Inc., SPIE Proceedings, vol. 309, paper #309–11, p. 26, Aug. 27–28, 1981.

Sementelli, R.G., "EC/IR dual band reconnaissance system DB–110", SPIE–*The International Society for Optical Engineering, Airborne Reconnaissance XIX*, vol. 2555–30, pp. 246–254, Jul. 11–12, 1995.

Lane, R.N., Delaney, J.K., "DB–110 Performance Update", SPIE–*The International Society for Optical Engineering, Airborne Reconnaissance XIX*, vol. 2555–30, pp. 246–254, Jul. 11–12, 1995.

RIehl, K., Maver, L.A, Sementelli, R.G., "The Raytheon DB–110 Sensor; Four Cameras in One Package", National Military Sensing Symposium, Nov. 1999.

Sementelli, R.G., "EC/IR dual band reconnaissance system DB–110", *SPIE–The International Society for Optical Engineering, Airborne Reconnaissance XIX* , vol. 2555–30, pp. 222–228, Jul. 11–12, 1995.

Lane, R.N., Delaney, J.K., "DB–110 Performance Update", *SPIE–The International Society for Optical Engineering, Airborne Reconnaissance XIX* , vol. 2555–30, pp. 246–254, Jul. 11–12, 1995.

Riehl, K., Maver, L.A., Sementelli, R.G., "The Raytheon DB–110 Sensor; Four Cameras in One Package", National Military Sensing Symposium, Nov. 1999.

U.S. patent application Ser. No. 09/654,031, Partynski et al., filed Aug. 30, 2000.

U.S. patent application Ser. No. 06/654,031 dated May 23, 2003.

U.S. patent application Ser. No. 10/313,727, Partynski et al., filed Dec. 6, 2002.

\* cited by examiner

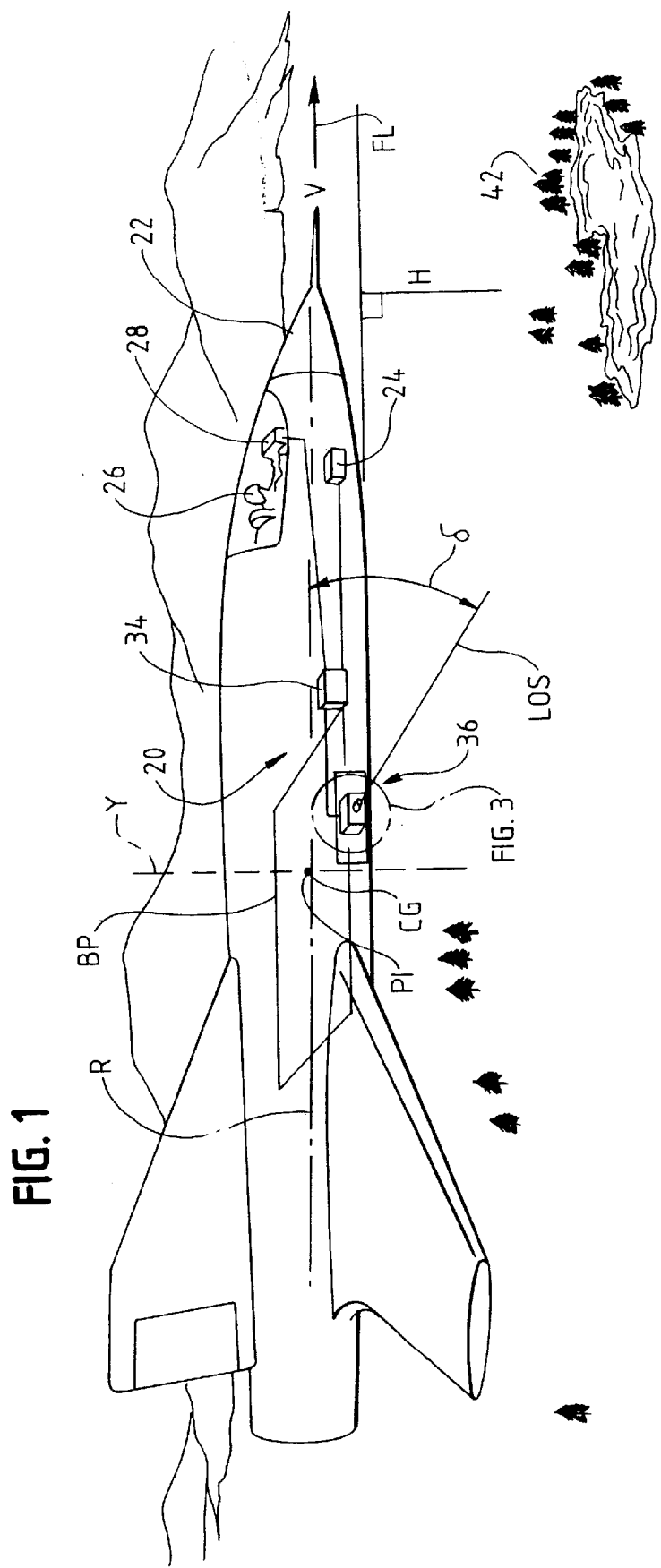

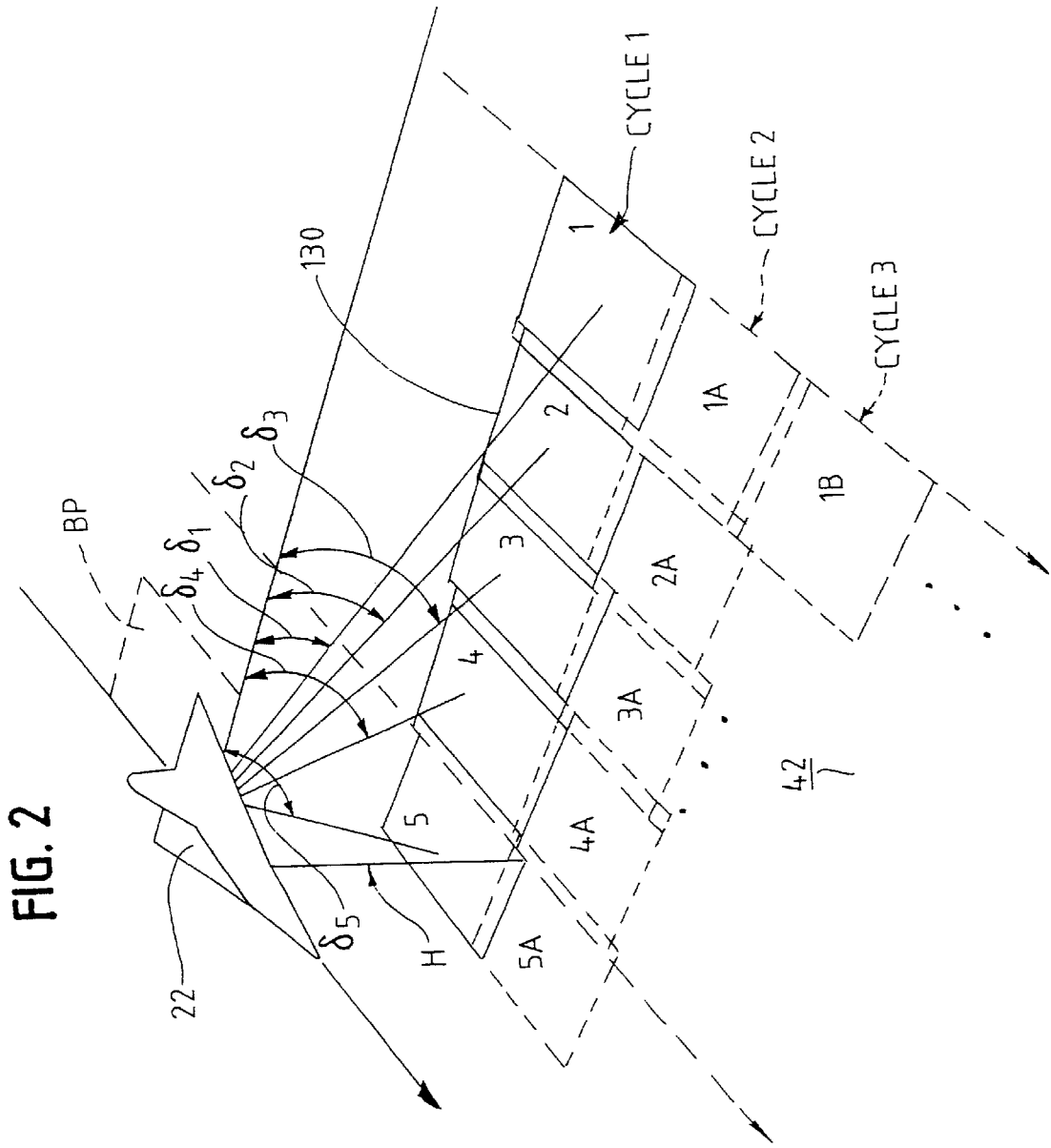

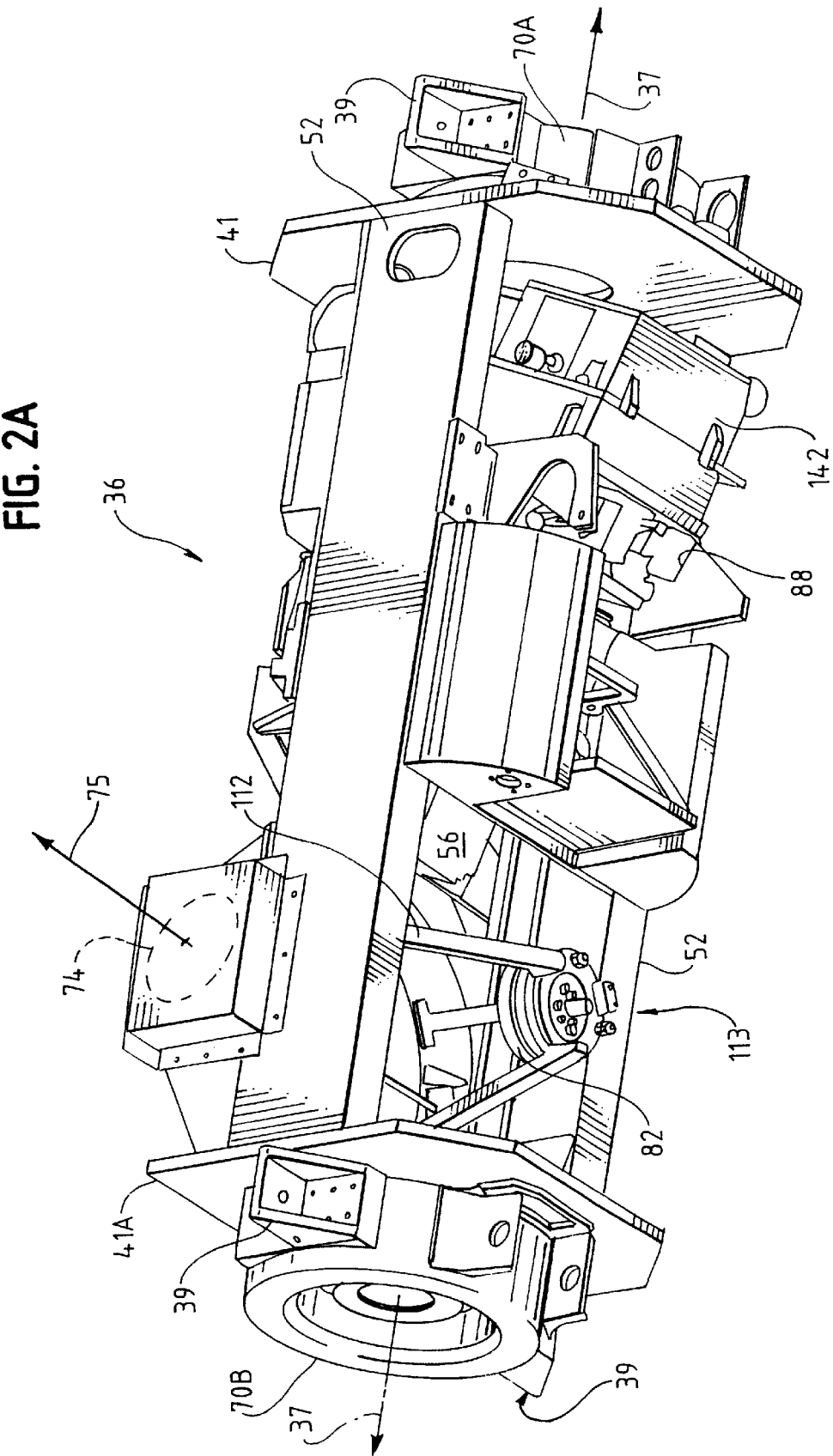

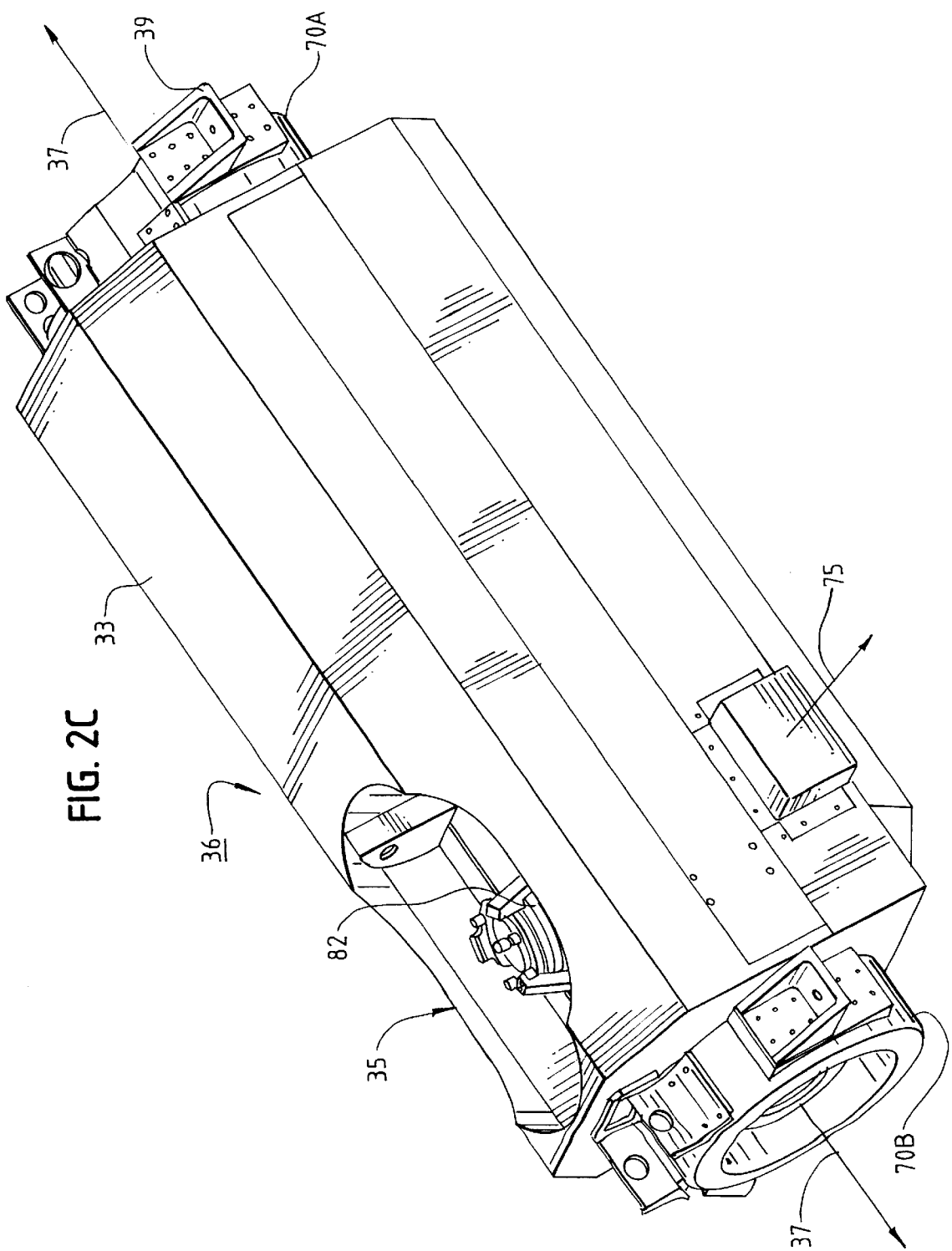

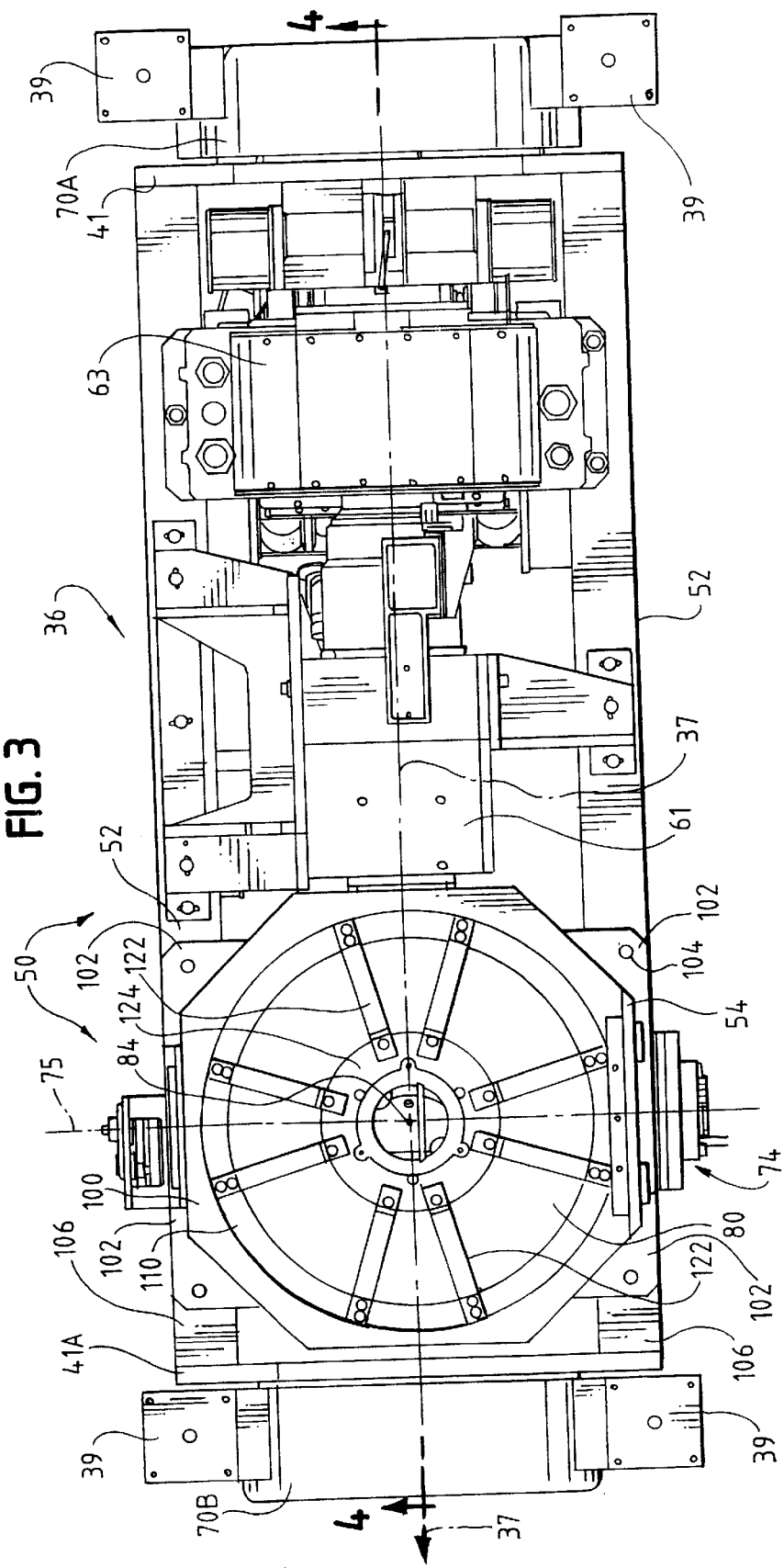

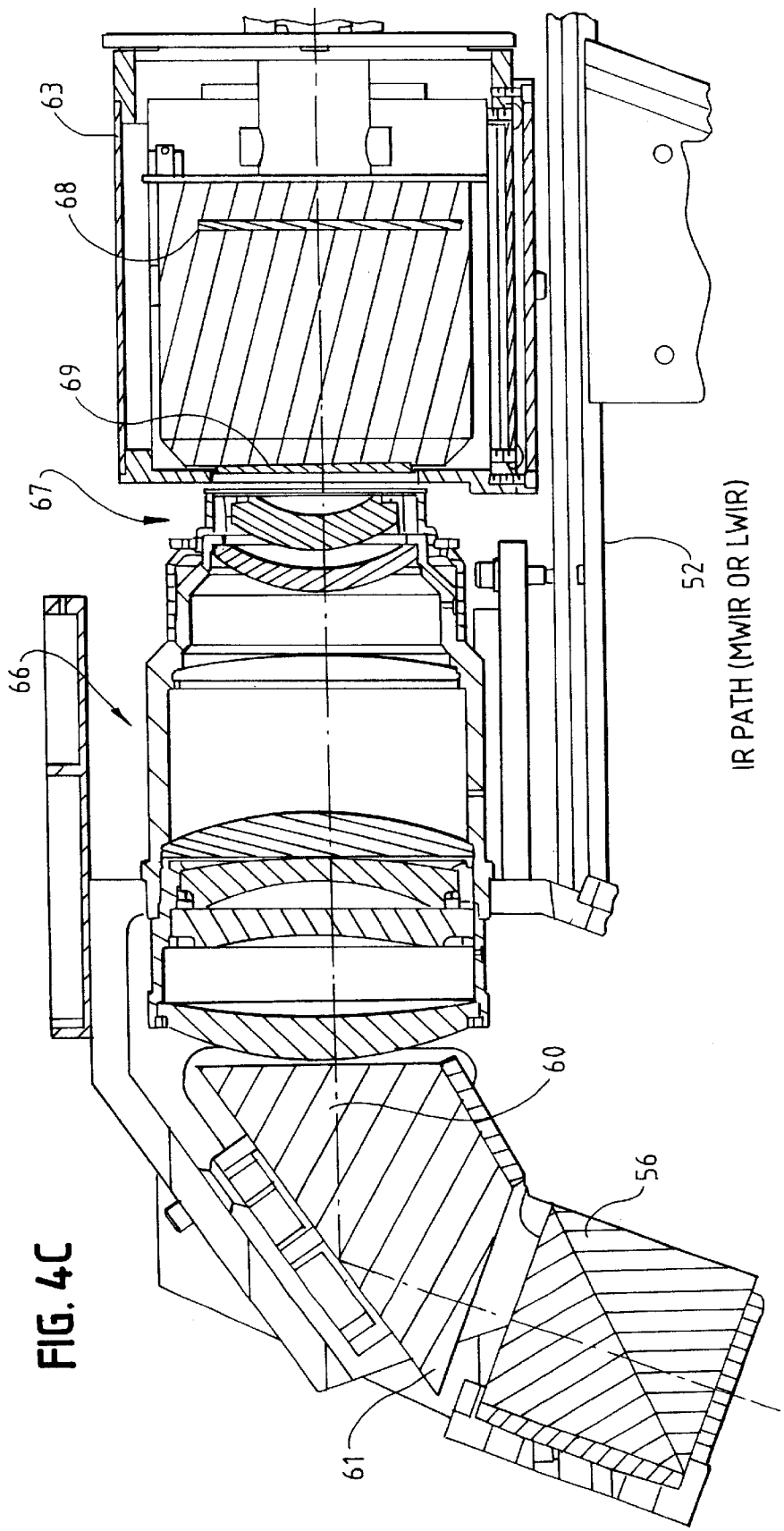

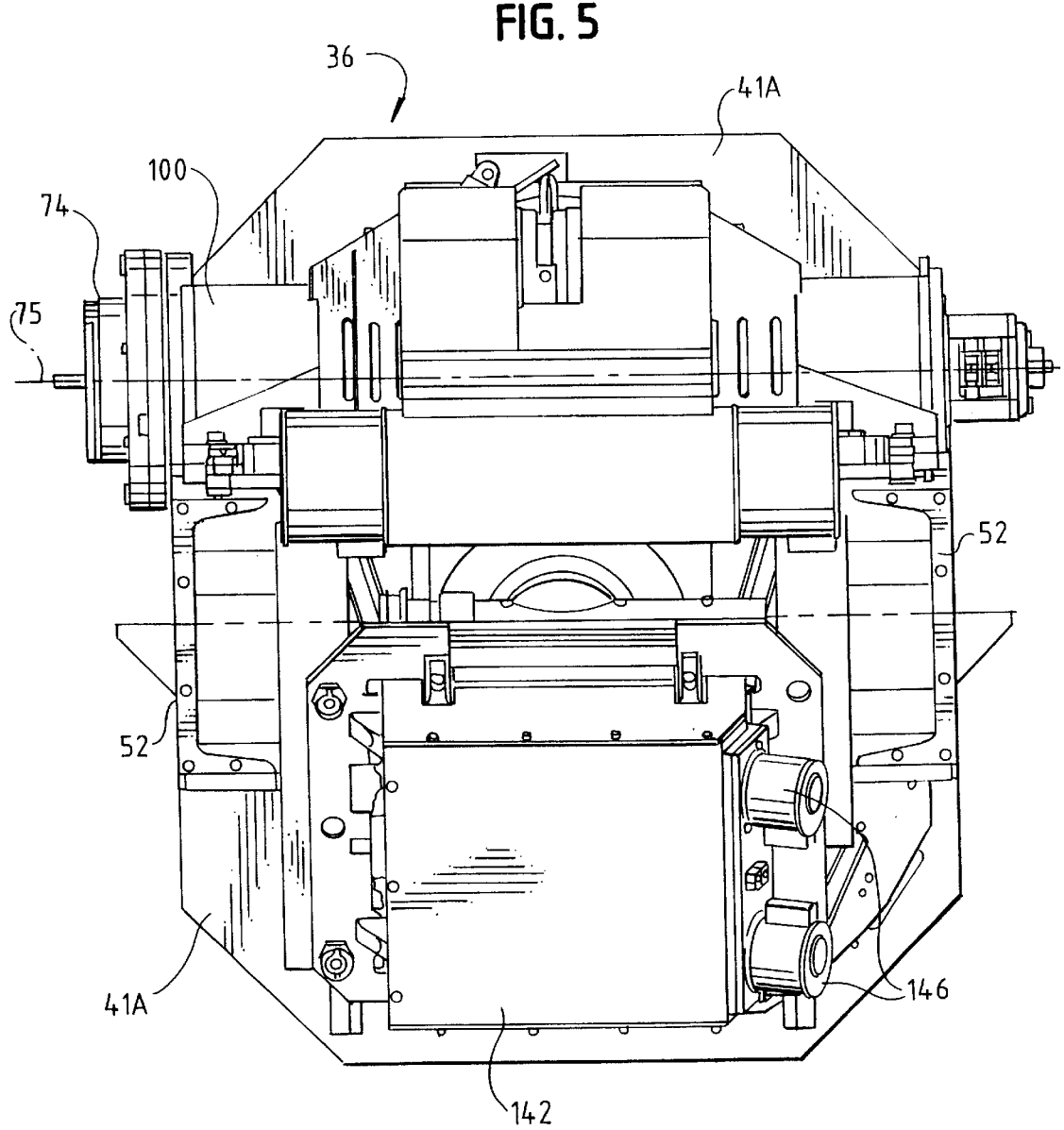

MODIFIED 50", F/4 VISIBLE PATH

MODIFIED 50", F/4 MWIR PATH

DUAL BAND FRAMING RECONNAISSANCE CAMERA

CROSS-REFERENCE TO RELATED APPLICATIONS

This is a continuation of Ser. No. 09/652,524 filed Aug. 31, 2000. This application is also related to the following patent applications, also filed on Aug. 31, 2000, the content of which is incorporated by reference herein:

Andrew J. Partynski et al., METHOD FOR FRAMING RECONNAISSANCE WITH ROLL MOTION COMPENSATION, Ser. No. 09/654,031;

Stephen R. Beran et al., METHOD OF FORWARD MOTION COMPENSATION IN AN AERIAL RECONNAISSANCE CAMERA, Ser. No. 09/652,965;

Stephen R. Beran et al., CASSEGRAIN OPTICAL SYSTEM FOR FRAMING AERIAL RECONNAISSANCE CAMERA, Ser. No. 09/652,529.

BACKGROUND OF THE INVENTION

A. Field of the Invention

This invention relates generally to the field of aerial reconnaissance photography and camera systems used for such photography. More particularly, in a principal aspect the invention relates to a reconnaissance camera that generates frames of imagery of terrain in different portions or bands of the electromagnetic spectrum simultaneously.

The invention also relates to a novel method by which a camera compensates for image motion due to both camera rotation and forward motion of the aircraft in which the camera is installed. Such image motion compensation allows for high-resolution images to be obtained from the camera system.

B. Description of Related Art

Long Range Oblique Photography (LOROP) cameras have been developed as a result of the need to obtain clear, high resolution pictures from longer ranges, typically from 10 to 50 nautical miles from the terrain of interest. The advent of LOROP cameras was an outgrowth of development of weapons technology, which could engage reconnaissance aircraft at ever-increasing distances, and geopolitical boundaries that became more and more difficult to encroach upon.

With the advent of LOROP cameras came the operational intricacies of using very sensitive and high performance instruments in a fashion that yielded the intelligence, i.e., image resolution, required of them. These operational issues were hostage to the technological limitations of the day. Initially, all cameras were film. Film LOROP cameras have been operated both as panoramic scanning (line scan) and framing cameras. Panoramic scan cameras collect an image with a smooth rolling motion of the camera while exposing film by pulling it passed a slit. The advantage of this approach was ease of implementation of the scanning mechanism. The disadvantage is that each line of exposed imagery was taken from a different perspective, hence the scanning system inherently was prone to creating geometrically and geospatially distorted images.

Subsequently, LOROP film framing cameras were employed. These cameras captured a frame of imagery by rapidly moving a slit across the film for exposure. The cameras utilized a scan head mirror assembly that could be moved in order to take successive frames of imagery at a selected depression angle relative to the horizon, depending on the target location.

Later, electro-optical line scan cameras entered the market as a filmless solution. Instead of film, the cameras used a solid state linear line scan charge coupled device (CCD) as a detector. These cameras used a scan mirror or the motion of the ground below the aircraft to scan the image across the line of photosensitive detectors that made up the CCD to form a frame, line by line. Again, the disadvantage of this method was that imagery was obtained from a different perspective as the aircraft moved, resulting in geometrically and geospatially distorted images.

Step framing cameras were developed which take a full frame of imagery at one time, then step the camera to a new angular position, take the next frame of imagery (with some overlap between the images to insure 100% coverage), step and generate a new frame of imagery, and so on until the desired scene is covered. The disadvantage of step framing cameras was that the stepping action was very difficult to accomplish with the whole camera, therefore it had to be broken into a scan head that performed the stepping and an image de-rotation mechanism, both of which were tied together by a synchronized drive system. The advantages of step frame cameras as compared to line scanning cameras are higher geometric fidelity and geospatial accuracy. Originally, full framing cameras were all film.

The next revolutionary step in the art of LOROP and tactical aerial reconnaissance cameras was the development of two-dimensional area array electro-optical (E-O) detectors. This occurred several years after the electro-optical linear arrays were first developed, and required semiconductor processing technology to mature many more years before such arrays were practical for reconnaissance use. Recon/Optical, Inc., the assignee of the present invention, in the early 1990's, introduced large area focal plane arrays to the recoiaissance industry. One such array is described in U.S. Pat. No. 5,155,597 to Andre G. Lareau et al., the contents of which are incorporated by reference herein. Such cameras were the first large area arrays to be used in tactical aircraft, as well as strategic reconnaissance aircraft such as the high altitude SR-71 aircraft. These large area arrays had the advantage of providing an image from a single point in space giving excellent geometric fidelity. Moreover, the high pixel count, and optimal pixel size, allowed such cameras to produce imagery having outstanding image resolution.

Furthermore, as described in the '597 Lareau et al. patent, it was possible to perform forward motion compensation in side oblique, forward oblique and nadir camera orientations electronically. U.S. Pat. No. 5,668,593, also to Lareau et al., describes a step-frame electro-optic camera system with electronic forward motion compensation. U.S. Pat. No. 5,798,786, also to Lareau et al., describes a method for compensation for roll, pitch or yaw motions of an aerial reconnaissance vehicle, in addition to forward motion compensation, electronically in the focal plane of an E-O detector. The '593 and '786 Lareau et al. patents are incorporated by reference herein.

Framing E-O LOROP camera systems were a logical platform to host the advanced detectors such as described in the Lareau et al. '597 patent. Electro-optical detectors, such as described in the Lareau et al. '597 patent, are capable of being fabricated from selected materials that can detect incident radiation in a variety of portions of the electromagnetic spectrum, and not just the visible spectrum. In particular, the advantages of large area framing can be enhanced by providing imaging capability in the infrared (IR) portion of the spectrum. A camera that generates frames of imagery in two distinct portions of the electromagnetic spectrum simultaneously is referred to herein as a "dual band framing camera." The patent to Gilbert W. Willey, U.S. Pat. No. 5,841,574, also assigned to Recon/Optical, Inc., describes a multi-spectral, decentered aperture, catadioptric optical system particularly suitable for a dual band line scannin, camera system having two linear electro-optical detectors, one for the visible or near IR (λ=0.5 to about 1.0 microns), and one for either the mid-wavelength IR (λ=about 3.0 to about 5.0 microns) or the long-wavelength IR (λ=about 8.0 to about 14.0 microns).

The technological capability of dual band framing LOROP cameras promises performance heretofore unavailable anywhere. However, the implementation of such a camera presents a number of difficulties and technical challenges beyond those posed for prior art systems. These challenges are optical, servo-mechanical and operational, and are discussed in further detail below. The present invention provides a dual band framing aerial reconnaissance camera system that overcomes these challenges and difficulties to provide an advanced, high resolution framing camera system that generates imagery of a scene of interest at two different bands of the electromagnetic spectrum.

SUMMARY OF THE INVENTION

A dual-band framing aerial reconnaissance camera for installation in an aerial reconnaissance vehicle has been invented. The camera includes an optical system incorporated into a camera housing. The optical system comprises an objective optical subassembly that receives incident radiation from a scene external of the vehicle. Radiation from the scene is reflected from the objective optical subassembly to a spectrum-dividing prism. The prism directs radiation in a first band of the electromagnetic spectrum, such as visible and near IR, into a first optical path and directs radiation in a second band of the electromagnetic spectrum, such as midwavelength IR or long wavelength IR, into a second optical path different from the first optical path. The first optical path includes suitable image forming and focusing lenses and a first two-dimensional image-recording medium for generating frames of imagery in the first band of the electromagnetic spectrum. The second optical path also includes suitable image forming and focusing lenses and a second two-dimensional image-recording medium generating frames of imagery in the second band of the electromagnetic spectrum.

The camera further includes a servo-mechanical subsystem. This subsystem includes a first motor system coupled to the camera housing that rotates the entire camera housing (including the optical system as recited above) about a first axis. The camera housing is installed in the aerial reconnaissance vehicle such that this first axis of rotation is parallel to the roll axis of the aerial reconnaissance vehicle (referred to herein for simplicity as "the roll axis"). The image recording media are exposed to the scene to generate frames of imagery as the first motor system rotates the camera housing in a continuous fashion about the roll axis. The first and second image recording media have a means for compensating for image motion due to the rotation of the camera housing. In an electro-optical embodiment of the image recording media, the roll motion compensation means is preferably comprised of electronic circuitry for clocking or transferring pixel information through the electro-optical detectors at a uniform rate substantially equal to the rate of image motion due to camera rotation. A method of calculating the image motion rate, and thus pixel information transfer rate, due to roll of the camera housing is disclosed herein. If a film camera is used for the image recording media, a mechanical system is used to move the film at a rate substantially equal to the image motion rate.

The servo-mechanical subsystem also includes a second motor system coupled to the objective optical subassembly. In the illustrated embodiment, the objective optical subassembly comprises a catoptric Cassegrain optical system. The second motor system rotates the Cassegrain optical system about a second axis in the direction of forward motion of the reconnaissance vehicle to compensate for the forward motion of the aerial reconnaissance vehicle. The action of the first motor assembly to rotate the entire camera housing about the roll axis occurs at the same time (i.e., simultaneously with) the action of the second motor system to rotate the Cassegrain optical system in the line of flight to accomplish forward motion compensation. The net effect of the action of the Cassegrain motor system and the roll motion compensation system is that the image of the scene of interest is essentially frozen relative to the focal plane of the image recording media while the media obtain the frames of imagery, allowing high resolution images of the scene in two different bands of the spectrum to be obtained simultaneously. Furthermore, the rotation of the image scene caused by the roll motion of the objective subassembly is simultaneously detrotated by the roll motion of the rest of the camera, in view of the fact that the entire camera assembly is rolled as a unit, thereby eliminating the need for a separate derotation mechanism such as a pechan prism. Other types of optical arrangements for the objective optical subassembly are possible, but are less preferred. The operation of the camera with the different type of objective subassembly is the same.

In a preferred embodiment, the first and second image recording media comprise two dimensional area array electro-optical detectors. One may be manufactured from materials sensitive to radiation in the visible and near-IR portion of the electromagnetic spectrum, and in a preferred embodiment is a charge-coupled device (CCD) detector of say 5,000×5,000 pixels. The other of the electro-optical detectors is made from a material sensitive to radiation in the infrared portion of the electromagnetic spectrum, and may be a platinum silicide array of photo diode detectors or other suitable type of electro-optical detector suitable for IR detection. The reader is directed to U.S. Pat. No. 5,925,883 to Woolaway, III, the contents of which are incorporated by reference herein, for a description of an IR detector. The detector sensitive to radiation in the infrared portion of the electromagnetic spectrum is preferably sensitive to radiation having a wavelength of between 1.0 and 2.0 microns (SWIR), 3.0 and 5.0 microns (MWIR), or from about 8.0 to about 14.0 microns (LWIR). In either of the embodiment of electro-optical detectors, they will typically comprise an array of pixel elements arranged in a plurality of rows and columns. The means for compensation for roll motion of the camera housing comprises electronic circuitry for transferring pixel information in the electro-optical detectors from row to adjacent row at a pixel information transfer rate (uniform across the array) substantially equal to the rate of image motion in the plane of the electro-optical detectors due to roll of the camera housing. The transfer of pixel information occurs while the pixel elements are integrating charge representing scene information. Thus, the roll motion compensation can be performed electronically on-chip.

As a further possible embodiment, electro-optical detectors with the capability for transferring pixel information in both row and column directions independently, such as described in Lareau et al., U.S. Pat. No. 5,798,786, could be used for the image recording media. Forward motion compensation and roll motion compensation could be performed on-chip in the detectors.

As noted above, the present invention required the solution to several difficult technical challenges, including optical, servo-mechanical and operational difficulties. For an electro-optical framing LOROP camera to operate in at least two discrete bands of the electromagnetic spectrum at the same time, the optical challenge is to focus panchromatic energy (e.g. visible through IR) on a focal plane detector with (1) good image quality and satisfactory modulation transfer function, (2) while baffling stray energy, (3) meeting space constraints, and (4) enabling the use of a relatively large two-dimensional area array as a focal plane detector to get an adequate field of view and resolution. In accordance with one aspect of the invention, these optical challenges were solved by a unique catoptric Cassegrain objective optical subassembly incorporating an azimuth mirror and utilizing separate field optics for each band of the spectrum, described in more detail herein.

The catoptric Cassegrain type of objective optical subassembly does not lend itself to the use of servo-mechanical systems developed for prior art LOROP systems, particularly those used in prior art step frame cameras (such as described in the Lareau et al. '593 patent). The prior art step frame cameras use a stepping mirror to step across the line of flight and direct radiation onto the array, and require a de-rotation mechanism, such as a Pechan prism, to de-rotate the images. The standard solution of stepping the entire LOROP camera system or even a large scan mirror assembly at the operational frame rate are not acceptable alternatives for large LOROP cameras, an in particular large dual band systems. In particular, the applications of the present invention are flexible enough to include both strategic and tactical aircraft, as well as the new breed of aircraft being used by the military for reconnaissance known as unmanned aerial vehicles (including low observables). The diversity of these applications posed a power and stability problem that prevents application of prior art solutions. The task of stepping a 400 lb. camera mass two to four times a second creates tremendous inertial loads as well as power spikes that would be unacceptable. Even the inertia and associated settling times of a stepped scan head assembly pose problems in some applications.

This servo-mechanical situation required a unique inventive solution, described in detail herein. The solution, as provided in one aspect of the present invention, was to (1) rotate the entire camera (including the entire optical system and the image recording media) smoothly in a continuous fashion about an axis parallel to the aircraft roll axis, similar to the pan-type movement, but without the starts and stops used in a traditional step-frame camera system, and (2) operating the camera as a framing camera while the camera undergoes the smooth rotation. Frames of imagery are thus taken while the camera smoothly rotates about the roll axis at a constant angular velocity. In addition to this novel "roll-framing" technique, the present invention also electronically compensates for, i.e., stops, the image motion due to roll while the camera is scanning in a smooth motion. Meanwhile, a novel forward motion compensation technique is performed by the Cassegrain optical subassembly to cancel out image motion effects due to the forward motion of the aircraft. The result enables exposures of the image recording media to the scene while compensating for roll and forward motion, enabling high-resolution images to be obtained.

The present invention thus solves the difficult optical, servo-mechanical and operational problems and provides a dual band framing electro-optical LOROP camera that delivers a performance and technical capability that has never before been achieved. In particular, it provides a system by which high-resolution frames of imagery in two different portions of the electromagnetic spectrum can be generated simultaneously. The inventive camera can be used in a quasi-stepping mode, in which overlapping frames of imagery are obtained across the line of flight. It can also be used in a spot mode, in which the camera is oriented in a particular direction to take an image of a target expected to be in the field of view.

Many of the teachings of the present invention are particularly applicable to a dual band electro-optical framing reconnaissance camera, and such a camera is the preferred embodiment. However, as explained below, some of the techniques and methods of the subject camera system, such as the roll-framing operation and unique roll and forward motion compensation techniques, are applicable to a camera system that images terrain in only one portion of the electromagnetic spectrum. Thus, in an alternative embodiment the camera is basically as set forth as described above, except that only a single detector is used and the spectrum-dividing prism and second optical path are not needed. Furthermore, while a preferred embodiment uses a two-dimensional electro-optical imaging array for the detector in each of the bands of the electromagnetic spectrum, the inventive camera system can be adapted to use film or other types of detectors for the photosensitive recording medium. In the film camera embodiment, roll motion compensation could be performed by moving the film in a manner such that the film velocity substantially matches the image velocity due to roll.

While the foregoing summary has described some of the highlights of the inventive camera system, further details on these and other features will be described in the following detailed description of a presently preferred embodiment of the invention.

BRIEF DESCRIPTION OF THE DRAWINGS

Presently preferred embodiments of the invention will be discussed below in conjunction with the appended drawing figures, wherein like reference numerals refer to like elements in the various views, and wherein:

FIG. 1 is a perspective view of an aircraft flying over a terrain of interest with a camera in accordance with the preferred embodiment operating to generate frames of imagery of the terrain in two bands of the electromagnetic spectrum simultaneously.

FIG. 2 is a schematic representation of the aircraft of FIG. 1 taking a series of 5 frames of images in a series of cycles while flying past the terrain of interest;

FIGS. 2A and 2B are perspective view of the camera system of FIG. 1, shown isolated from the rest of the aircraft, and with protective covers removed in order to better illustrate the components of the camera;

FIG. 2C is a perspective view of the camera of FIGS. 2A and 2B, with the protective covers installed, and showing the entrance aperture for the catoptric Cassegrain optical system;

FIG. 3 is a top plan view of a presently preferred embodiment of the dual band framing reconnaissance camera system of FIGS. 2A–2C, with the covers removed;

FIG. 5 is an end view of the camera system of FIGS. 3–4, shown from the right-hand end of the camera housing and with the roll motor and cover plate at that end removed in order to better illustrate the other structures in the camera;

DETAILED DESCRIPTION OF THE PREFERRED EMBODIMENT

Figure 2B:
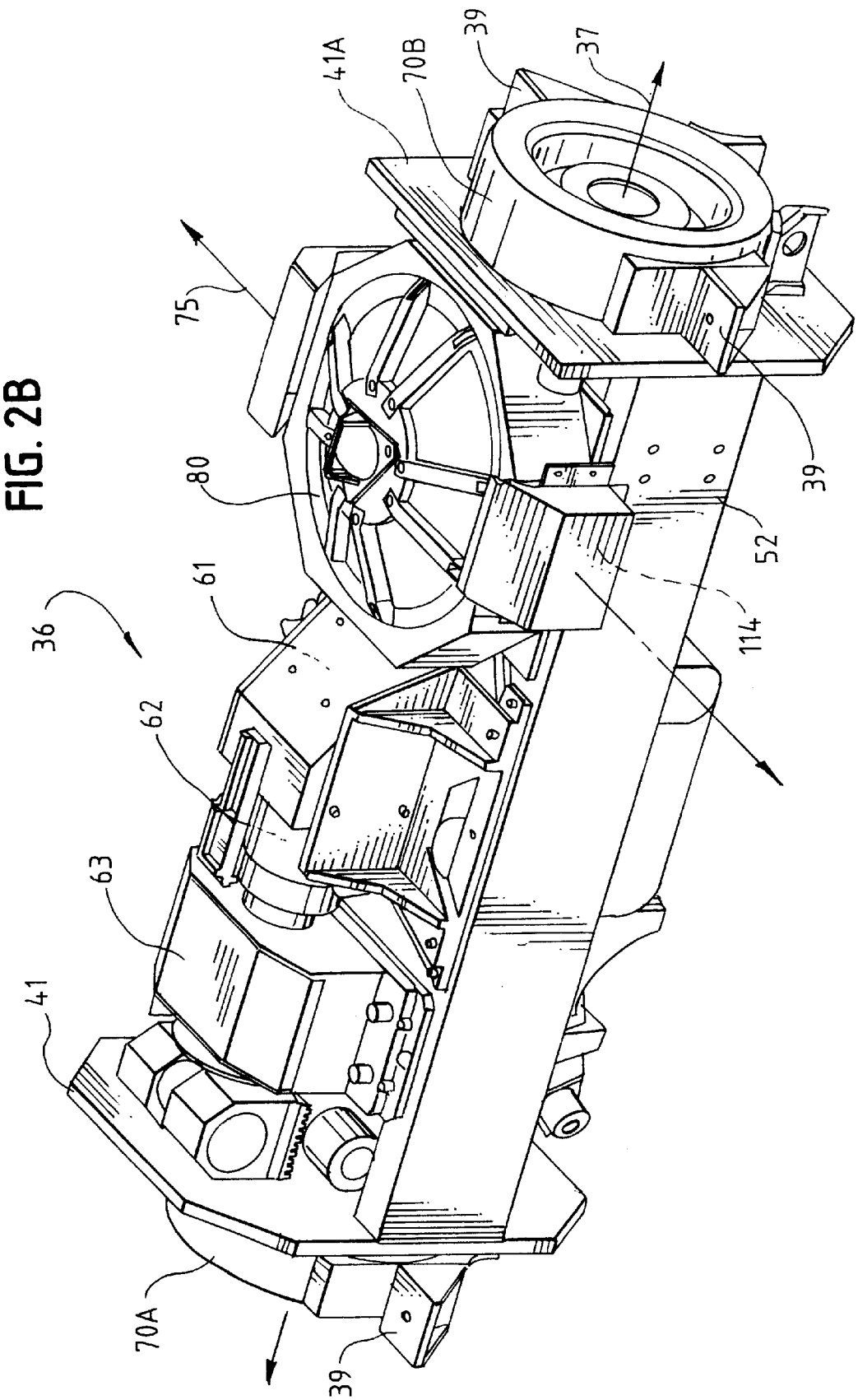

Overview and Method of Operation:

Referring now to FIG. 1, an aerial reconnaissance camera system 20 in accordance with a preferred embodiment of the invention is shown installed in a reconnaissance aircraft 22 flying over a terrain of interest 42 at an altitude H and with forward velocity V, moving in a direction of flight FL. The aerial reconnaissance camera system 20 includes a camera 36, shown in greater detail in FIGS. 2A–2C and 3–5, a camera control computer 34 and associated electronics described in further detail in FIGS. 17 and 19. The camera control computer receives certain navigational information from the aircraft avionics system 24, including current aircraft velocity and height data. Additional camera system inputs may come from a console 28 in the cockpit, such as start and stop commands or camera depression (roll angle) settings.

The aircraft body defines a roll axis R, a pitch axis PI and a yaw axis Y passing through the center of gravity CG of the aircraft. The camera 36 is shown orientated at a camera depression angle δ relative to a bilateral plane BP that is horizontal during level flight. In the illustrated embodiment, the line of sight LOS of the camera 36 is nominally orthogonal to the roll axis in a side oblique or nadir orientation.

The preferred embodiment of the subject camera system 20 operates like a step-frame electro-optic (E-O) sensor, capable of taking a sequence of overlapped frames in the cross-track, i.e., cross-line of flight, direction. This is shown in FIG. 2. As the aircraft flies by the terrain of interest, the camera is rotated about the roll axis in a continuous fashion (i.e., without starts and stops between frames), with frames of imagery taken at different depression (roll) angles, e.g., angles δ1, δ2, δ3, δ4 and δ5, resulting in frames 1, 2, 3, 4 and 5. A nominal rate of rotation about the roll axis is used (based on focal length, array frame size and framing rate, such as 8–10 degrees per second, but the roll rate is adjustable by the camera control computer. When the fifth frame of imagery is obtained and the camera rolled to its roll limit position (either pre-set or commanded by the operator), the camera rotates back, i.e., retraces, to its initial roll position (δ1), and the second cycle of frames of imagery is obtained (1A, 2A, 3A, 4A, 5A). The process repeats for a third and subsequent cycles of operation.

The cross-track framing sequence 1, 2, 3, 4, 5; 1A, 2A, 3A, 4A, 5A; etc. (which is V/H dependent) can be made in either spectrum individually or in both spectrums simultaneously, dependent on the time of day and the purpose of the reconnaissance mission. As noted in FIG. 2, the roll action of the camera can encompass both sides of nadir, for example with frames 1–4 obtained at one side of nadir and frame 5 obtained at the other side of nadir. The camera can also be used in a spot mode, in which the camera is rotated to a particular depression angle and frames of imagery obtained of the scene of interest. The number of frames per cycle of roll, N, can thus vary from 1 to say 5 or 10 or until horizon to horizon coverage is obtained.

Figure 4:
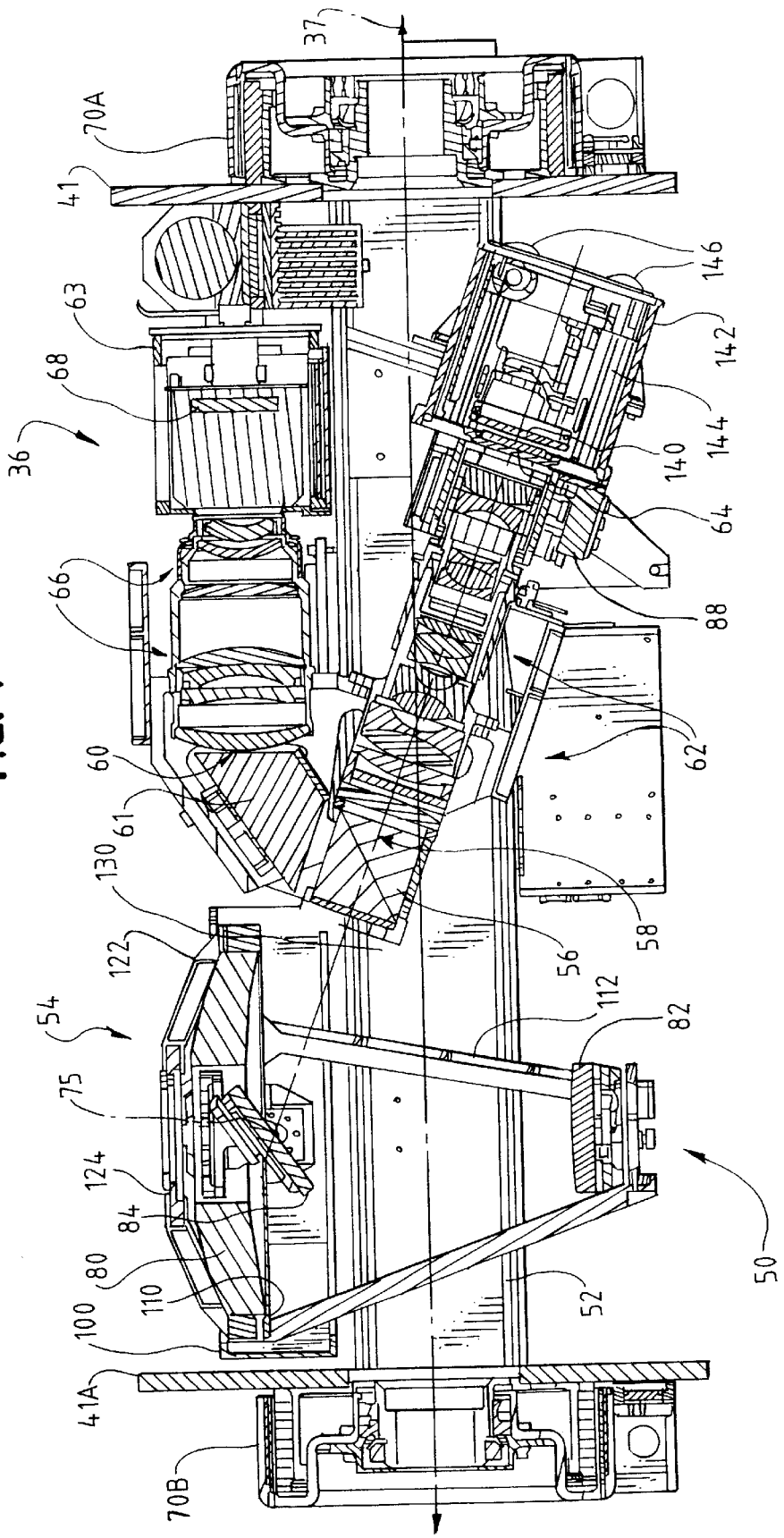
FIG. 4 is a cross-sectional view of the camera system of FIG. 3, taken along the lines 4—4 of FIG. 3.

FIG. 2A shows the camera 36 in a perspective view as seen from below, with a set of protective cover plates removed in order to better illustrate the structure of the camera. FIG. 2B is another perspective view, shown from above, and FIG. 2C is a perspective view of the camera 36 with the cover plates 33 installed, showing the entrance pupil 35 for the camera. Referring now to FIGS. 3–5, the camera 36 per se is shown in top, sectional and end views, respectively. In the end view of FIG. 5, a rear support plate 41 and a roll motor 70A are removed in order to better illustrate the rest of the camera 36.

Figure 12:
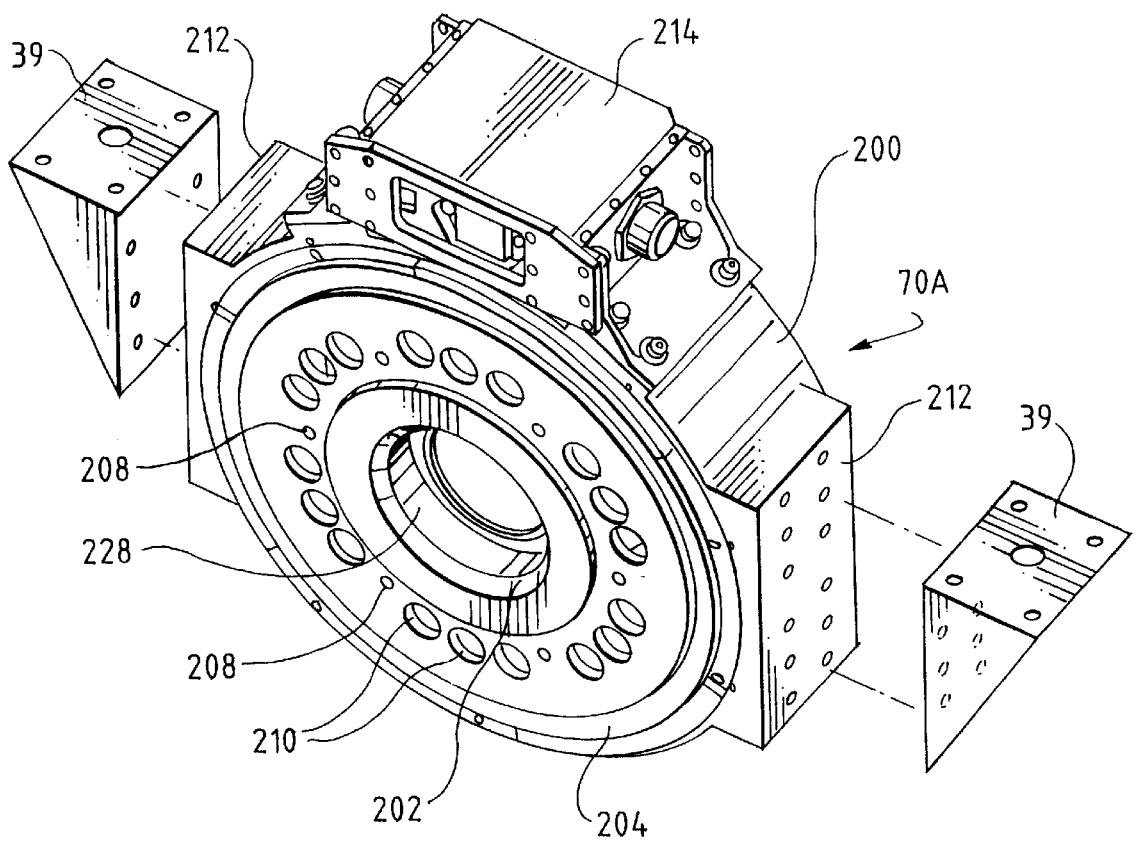
FIG. 12 is a detailed perspective view of one of the roll motor assemblies of FIG. 2, showing the L shaped brackets that mount to the stator of the motor and rigidly couple the roll motor to the pod or aircraft.

As shown best in FIG. 3, the camera 36 mounts to the reconnaissance pod or airframe of the aerial reconnaissance vehicle via four mounting brackets 39, each connected to the pod or airframe via passive shock isolation mounts in conventional fashion. The mounting brackets 39 are bolted to the sides of the stator of the roll motor assemblies 70A and 70B as shown in FIG. 12 and described below. The entire camera cylinder comprising all the components between the two support plates 41 and 41A can rotate relative to the roll axis 37 while the stator of the roll motors 70A and 70B and mounting brackets 39 remain in a fixed position relative to the aerial reconnaissance vehicle.

The basic configuration of the camera 36 is a cylinder, as perhaps best illustrated in FIG. 2C, which in the illustrated embodiment is approximately 20 inches in diameter and 48 inches in length. The camera 36 is installed in an aircraft reconnaissance pod via the mounting brackets 39 such that the cylinder axis 37 is oriented nominally parallel to the flight direction of the aircraft, i.e., the roll axis of the aircraft. The fore/aft orientation of the camera can be either way. Additionally, the camera 36 can be installed such that it is oriented perpendicular to the line of flight.

A typical use of the camera is to take overlapping frames of images in the cross-track direction as the aircraft flies over the scene of interest as shown in FIG. 2, similar in concept to the step frame operation described in the prior art patent of Lareau, et al. U.S. Pat. No. 5,668,593 and earlier step frame film cameras. However, the manner in which the camera achieves this result is very different from that taught in the prior art. Whereas in the Lareau '593 patent, a stepping mirror is rotated in discrete steps to image the terrain, and forward motion compensation is performed in the array itself electronically, in the preferred embodiment of the present invention the entire camera 36 is rotated at a constant angular velocity, and in a continuous fashion, about the roll axis 37. The roll rate is determined by the optical system focal length, frame size, frame rate and the desired cross-track overlap (typically 5%) between consecutive frames. Moreover, forward motion compensation is achieved by means of rotation of the Cassegrain optical system about an axis 75, as described below, not in the array.

Figure 4A:
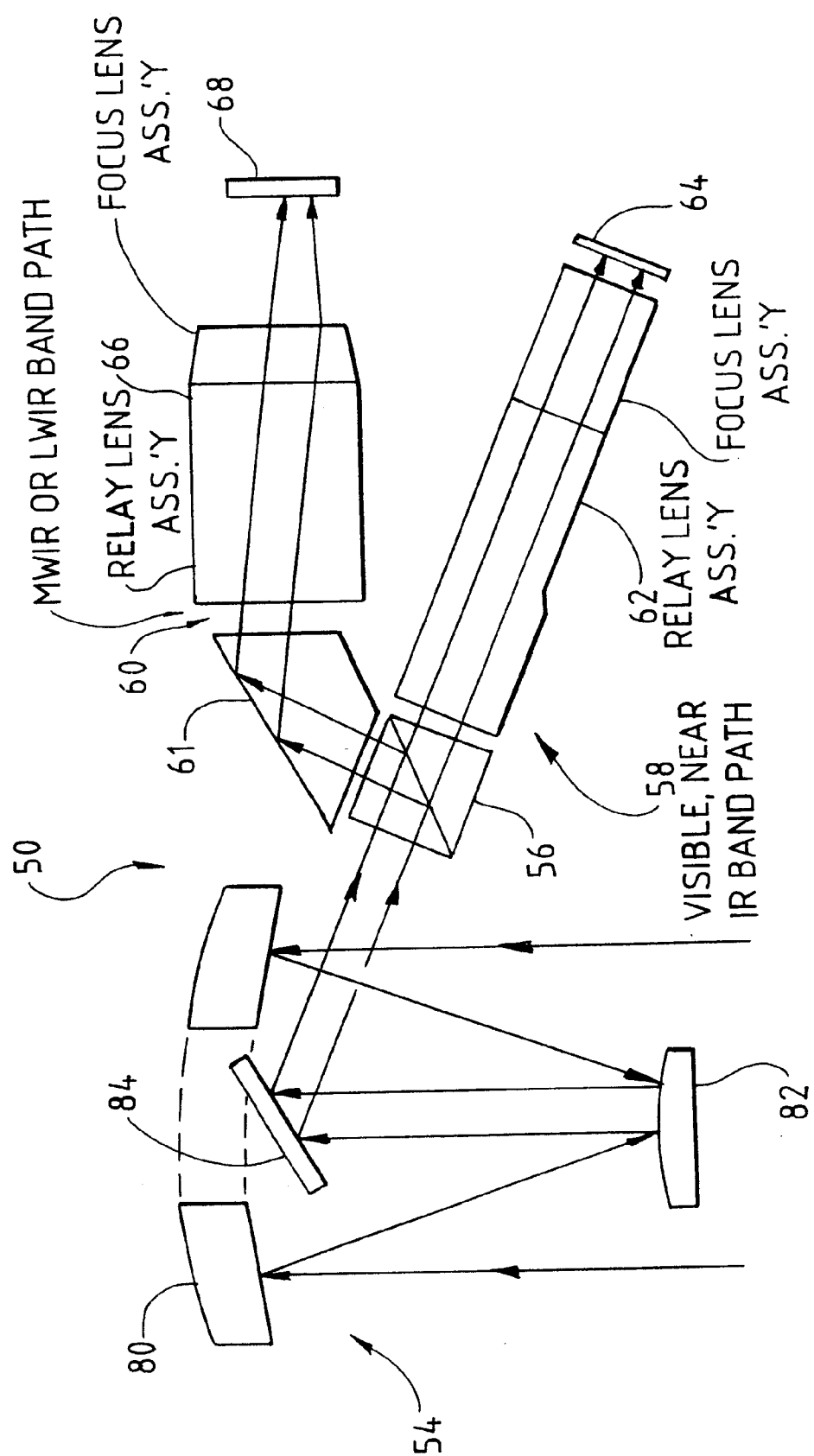
FIG. 4A is a simplified ray diagram of the optical system of FIGS. 3 and 4.
Figure 4B:
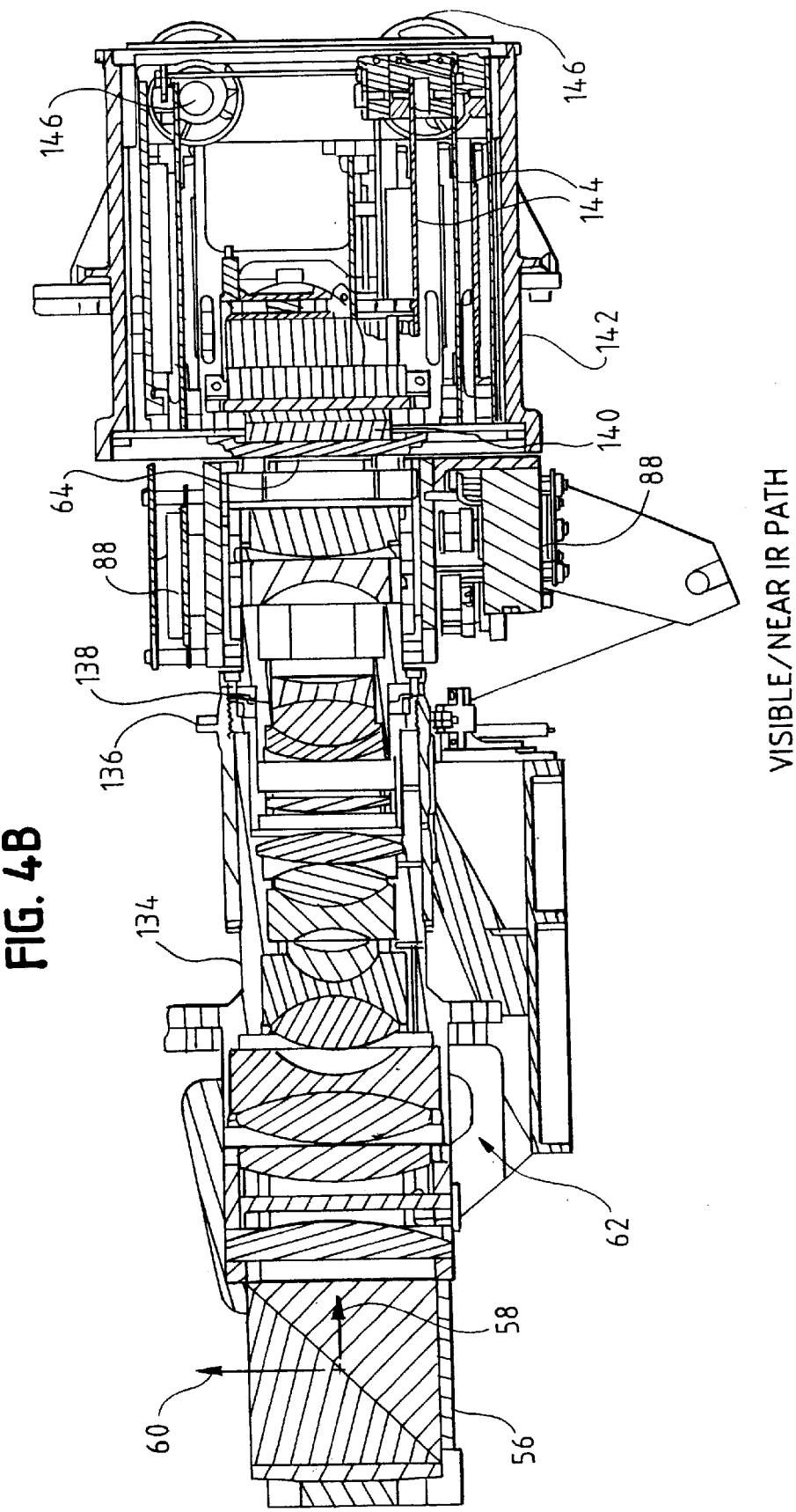
FIGS. 4B and C are more detailed cross-sectional views of the optical elements in the visible and MWIR paths of FIGS. 4 and 4A.

Referring to FIGS. 3 and 4, the camera includes an optical system 50 which is incorporated into (i.e., mounted to) a camera housing or superstructure 52. The optical system 50 in the preferred embodiment comprises a novel catoptric Cassegrain objective optical subassembly 54 which receives incident radiation from a scene external of the vehicle. FIG. 4A shows a simplified ray diagram for the optical system 50. The Cassegrain objective optical subassembly includes a primary mirror 80, a secondary mirror 82 and a flat azimuth mirror 84. The secondary mirror 82 is centrally located in the entrance aperture of the Cassegrain optical system. Radiation from the scene is reflected from the Cassegrain objective subassembly 54 to a spectrum-dividing prism 56. The prism 56 directs radiation in a first band of the electromagnetic spectrum, such as visible and near IR, into a first optical path 58 and directs radiation in a second band of the electromagnetic spectrum, such as mid-wavelength IR or long wavelength IR, into a second optical path 60 different from the first optical path. The first optical path 58 includes suitable image forming and focusing lenses 62 and a first two-dimensional image recording medium 64 for generating frames of imagery in the first band of the electromagnetic spectrum. The second optical path 60 includes a fold prism 61, suitable image forming and focusing lenses 66 and a second two-dimensional image recording medium 68 which generates frames of imagery in the second band of the electromagnetic spectrum.

The camera further includes a novel servo-mechanical subsystem. This subsystem includes a first motor system 70A and 70B coupled to the camera housing 59 that rotates the camera housing 52 (including the optical system 50 as recited above) about the roll axis 37. The image recording media 64 and 68 are exposed to the scene to generate frames of imagery as the first motor system 70A and 70B rotates the camera housing 52 in a continuous fashion about the roll axis 37. The first and second image recording media have a means for compensating for image motion due to the rotation of the camera housing. In an electro-optical embodiment of the image recording media, the roll motion compensation means is preferably comprised of electronic circuitry for clocking or transferring pixel information through the electro-optical detectors at a uniform rate substantially equal to the rate of image motion due to camera rotation. A method of calculating the image motion rate, and thus pixel information transfer rate, due to roll of the camera housing is described below. If a film camera is used for the image recording media, a mechanical system is used to move the film at a rate substantially equal to the image motion rate. Film drive mechanisms for moving film for purposes of motion compensation are known in the art and can be adapted for a film framing camera for purposes of roll motion compensation by persons skilled in the art.

Figure 6:
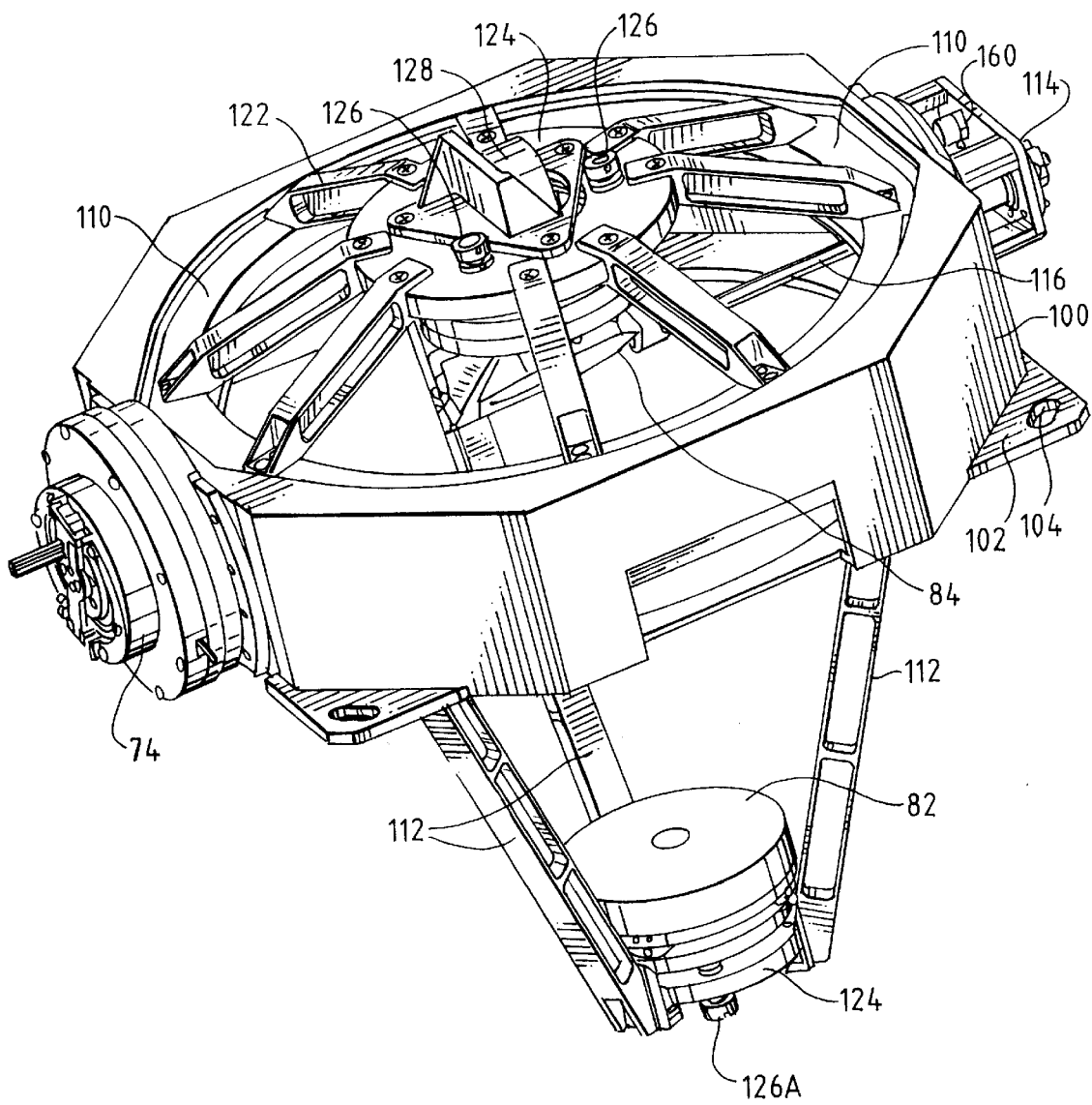
FIG. 6 is a perspective view of the assembly of the Cassegrain subsystem, showing in better detail the structure that retains the Cassegrain primary mirror and showing the secondary mirror, azimuth mirror, Cassegrain motor assembly and azimuth 2-1 drive assembly in greater detail. The primary mirror itself is removed from FIG. 6 in order to better illustrate the components of the Cassegrain optical system.

The servo-mechanical subsystem also includes a second motor system 74, shown best in FIGS. 3, 5 and 6, coupled to the front end of the Cassegrain optical system 54. The second motor system 74 rotates the Cassegrain objective subassembly 54, including the primary, secondary and azimuth mirrors, about a second axis 75 in the direction of forward motion of the reconnaissance vehicle in a manner to compensate for forward motion of the aerial reconnaissance vehicle. In the illustrated embodiment, the azimuth mirror 84 is rotated about the axis 75 at one half the rate of rotation of the Cassegrain primary and secondary mirrors 80 and 82 in the direction of forward motion. The action of the first motor assembly 70A and 70B to rotate the entire camera housing about the roll axis occurs at the same time (i.e., simultaneously with) the action of the second motor system 74 to rotate the Cassegrain optical system 80, 82 and 84 in the line of flight to accomplish forward motion compensation. The net effect of the action of the Cassegrain motor system 74 and the roll motion compensation technique is that the image of the scene of interest is essentially frozen relative to the focal plane of the image recording media while the image recording media obtain the frames of imagery, allowing high resolution images of the scene in two different bands of the spectrum to be obtained simultaneously.

During operation, as the entire camera 36 rotates by action of the roll motors 70A and 70B, exposure of the detectors 64 and 68 at the two focal planes is made. In the illustrated embodiment, in the visible spectrum path 58 the exposure is executed by means of a mechanical focal plane shutter 88 which opens to allow incident photons to impinge on a two-dimensional charge-coupled device E-O detector array 64. In the MWIR path 60, exposure is executed by electronic switching (on/off) of IR-sensitive photocells arranged in a two-dimensional array 68, basically by dumping charge accumulating prior to the initiation of exposure and then accumulating and storing charge when the exposure period commences. However, any method of exposure control will work with this roll-framing camera.

When the initial exposure is complete, the data is read out from the two focal plane detectors 64 and 68 and they are placed in condition for a second exposure. The rotation of the entire camera assembly about the roll axis 37 continues smoothly (that is, without starting and stopping as for example found in a prior art step frame camera system). When the next exposure is ready to be taken, i.e., when depression angle δ2 of FIG. 2 has been reached, the shutter is opened in the visible/near IR path; similarly, in the MWIR path the charge dumping ceases and charge is accumulated. The data is then read out of the two focal plane sensors after the exposure period is over. Meanwhile, the rotation of the entire camera system about the roll axis continues without interruption and a third and subsequent exposure of both cameras is taken if time permits. The process continues until the angular limit of the framing cycle has been reached, at which time the roll motors 70A and 70B retrace their angular rotation and return to their original angular position. The process then repeats for a new cycle of framing, as indicated in FIG. 2.

The camera system roll rate (the cylinder angular velocity), $\omega$, is established as follows. First, determine the cross-track field of view per frame, $\Phi$, according to equation (1):

$$\Phi = 2 \text{ ARCTAN } (W/2f), \quad (1)$$

where

W=detector array size in the cross-track direction; and f=lens focal length (i.e, the focal length of the overall aggregate of optical components in the particular band of interest, e.g., the visible band).

Then, the cylinder angular velocity $\omega$ is computed according to equation (2):

$$\omega = \Phi(FR)(1-OL_c), \quad (2)$$

where

FR=system frame rate (frames per second)

$OL_c$=overlap between consecutive cross-track frames (expressed as a decimal).

Note that the cylinder angular velocity $\omega$ is independent of the aircraft's velocity and height above the earth. Typical angular rotations between the successive exposures of the array will be less than 10 degrees.

Since the focal plane detectors are rotating about the roll axis during the exposure period, the scene image is translating across each of the detector arrays in the cross-track direction at a fixed velocity $v=f\omega$. The image motion due to camera roll is constant and uniform across the array. To compensate for this image motion, and thereby preserve resolution, this image motion is synchronized with the velocity at which charge representing scene information is transferred within the detector arrays, thus eliminating relative motion between the image and the pixels imagining the scene and thus eliminating the image smear that would otherwise take place at the detector. In other words, pixel information in the entire array is transferred in the direction of image motion from row to adjacent row at a rate that substantially matches the image velocity v.

At the end of the exposure period (typically 0.0005 to 0.020 seconds), the cylinder continues rotating to the next scene position while the collected scene signals are read-out of the detector array(s). Note that there is no rotational start and stop between exposures, as found in prior art step frame camera systems, thereby avoiding the servo loop settling times, load current surges, and power spikes produced by mechanical stepping systems as noted earlier.

In this "roll-framing" type of operation, the two focal plane detectors 64 and 68 operate in the above manner, taking N consecutive cross-track frames, N being dependent on the time available or by the intended mode (maximum coverage, limited coverage or spot mode) of operation. The result is a series of frames of images similar to that produced with a step frame camera system, as indicated in FIG. 2, each frame taken in two different bands of the electromagnetic spectrum. In maximum coverage mode, N is determined by the V/H ratio of the mission, the camera system depression angle range and the framing rate, and N can be as many as 10 frames/cycle (or more) in normal operation. At the end of the cross-track cycle, the camera system or cylinder is rotated back (reset) to the first frame angular position and the cycle repeats until the intended in-flight direction coverage is achieved. The camera can generate overlapping frames of imagery similar to that shown in FIG. 1, where N in the illustrated example=5.

In spot mode, a one or two frames/cycle is executed, with the camera aimed at a specific predetermined depression (roll) angle and fore/aft azimuth angle where a target or specific interest is expected to be. In this example, N will typically equal 1 or 2. The cycle may repeat for as many times as needed.

As another mode of operation, the camera could be used in a traditional step frame operation. In this mode, the camera would rotate between successive angular positions, and the photosensitive media would generate two-dimensional images of the terrain. If the camera body rotation is stopped during scene exposure, forward motion compensation could be performed in the photosensitive media, such as described in the earlier Lareau et al. patents.

The preferred forward motion compensation method will now be described with a little more specificity. As the exposures are made at either of the two detectors 64 and 68, the aircraft is moving at some known velocity. The forward motion of the aircraft is neutralized in a novel way in the preferred embodiment. Whereas in the prior art Lareau et al. '586 patent forward motion compensation is performed on-chip in the array, the forward motion compensation of the preferred embodiment is performed by rotation of the Cassegrain objective subassembly, i.e, the Cassegrain primary and secondary mirror assembly, in the flight direction at a rate=V/R (in units of radians per second) where V is the aircraft velocity and R is the range to the scene of interest. The value of R can be derived from simple geometry from the known aircraft height and camera depression angle ($\delta_i$) and assuming the earth is flat in the scene of interest, from a Global Positioning System on board the aircraft, using an active range finder, or by computing range from successive frames of imagery as described in the patent of Lareau et al., U.S. Pat. No. 5,692,062, which is incorporated by reference herein. As the Cassegrain primary and secondary mirrors 80 and 82, respectively, are rotated at the V/R rate in the direction of flight, the flat azimuth mirror 84, located in the optical path between the secondary reflector and the Cassegrain image plane 86, is rotated at a rate equal to ½ (V/R) in the same direction, thus "stopping" image motion due to aircraft forward motion at the image plane. Thus, the rotating Cassegrain objective lens and the half speed azimuth mirror provide the needed forward motion compensation function.

As an alternative embodiment, the Cassegrain optical system could remain fixed and both forward motion compensation and roll motion compensation could be performed in the focal plane detector by transferring pixel information in both row and column directions in accordance with the principles of the Lareau et al. patent, U.S. Pat. No. 5,798,786.

From the FIGS. 1–5 and 18 and the above discussion, it will be appreciated that we have invented a method of generating frames of imagery of a scene of interest with an aerial reconnaissance camera in two different bands of the electromagnetic spectrum simultaneously. The method includes the steps of:

(a) providing two photosensitive electro-optical detectors 64, 68 in the camera 36, each of the detectors comprising an array of pixel elements arranged in a plurality of rows and columns;

(b) rotating the camera 36 in a continuous fashion about a roll axis 37 either coincident with or parallel to a roll axis R of an aerial reconnaissance vehicle carrying the camera;

(c) while rotating the camera 36, simultaneously exposing the electro-optical detectors 64, 68 to a scene of interest in a series of exposures;

(d) while rotating the camera 36 and while exposing the electro-optical detectors 64 and 68 to the scene, rotating an optical system 54 providing an objective lens for the camera in the direction of forward motion of the vehicle at a predetermined rate to cancel out image motion due to forward motion of the vehicle; and (e) while the electro-optical detectors 64 and 68 are being exposed to the scene, moving pixel information in the arrays at a rate and in a direction substantially equal to the rate of image motion due to rotation of the camera about the roll axis, to thereby preserve resolution of images generated by the detectors.

Table 1 lists performance specifications for a presently preferred dual band step frame camera system in accordance with the invention.

TABLE 1

| | |
|---|---|
| Focal Length &f/# | |
| Visible Channel | 50.0 inches - f/4.0 |
| (Options) | 72.0 inches - f/5.8 |
| | 84.0 inches - f/6.7 |
| MWIR Channel | 50.0 inches - f/4.0 |
| Optical System | |
| Type: | Cassegrain objective lens with spectrum beam divider and individual visible channel and MWIR channel relay lenses. |
| Operating Spectrums = | |
| Visible Channel - 0.50 to 0.90 microns | |
| MWIR Channel - 3.0 to 5.0 microns | |
| Entrance Pupil Diameter: | |
| 12.5 inches, both channels, all focal lengths. | |
| Detectors: | |
| Visible Channel: | 5040 mm × 5040 pixels |
| | .010 mm × .010 mm pixel pitch |
| | 50.4 mm × 50.4 mm array size |
| | 4.0 frames/sec max. |
| MWIR Channel: | 2016 × 2016 pixels |
| | .025 mm × .025 pixel pitch |
| | 50.4 mm × 50.4 mm array size |
| | 4.0 frames/sec max. |
| MWIR Channel: | 2520 × 2520 pixels |
| (future) | .020 mm × .020 mm pixel pitch |
| | 50.4 mm × 50.4 mm array size |
| | 4.0 frames/sec max. |
| FOV (per frame): | |
| VIS Channel: | 2.27° × 2.27° (50 inch F.L.) |
| | 1.58° × 1.58° (72 inch F.L.) |
| | 1.35° × 1.35° (84 inch F.L.) |
| MWIR Channel: | 2.27° × 2.27° (50 inch F.L.) |
| Frame Rates: | Variable, up to 4.0 fr/sec |
| | Both channels, all focal lengths. |
| Pixel IFOV: | |
| VIS Channel: | 7.9 × $10^{-6}$ RAD (50 inch F.L.) |
| | 5.5 × $10^{-6}$ RAD (72 inch F.L.) |
| | 4.7 × $10^{-6}$ RAD (84 inch F.L.) |
| MWIR Channel: | 19.7 × $10^{-6}$ RAD (50 inch F.L.) |
| | 15.8 × $10^{-6}$ RAD (50 inch F.L.) (future) |
| Ground Resolvable Distance (GRD) (at range, perpendicular to the LOS). | |
| VIS Channel: | 3 ft @ 31 N mi. (NIIRS-5) (50") |
| | 3 ft @ 45 N mi. (NIIRS-5) (72") |
| | 3 ft @ 52 N mi. (NIIRS-5) (84") |
| MWIR Channel: | 3 ft @ 12.5 N mi. (NIIRS-5) (50") |
| (Future) | 3 ft @ 15.6 N mi. (NIIRS-5) (50") |
| Field of Regard: | Horizon to Horizon, or as limited by vehicle windows (5° to 30° depression below horizon (δ) is typical). |

TABLE 1-continued

Scene coverage rate: Variable cross-track.
Roll rate: 8.6°/sec - (50 inch focal length, 4 Fr/Sec.)

Preferred Dual Band Camera Detailed Mechanical and Servo-Mechanical Description

With the above overall description in mind, attention is directed primarily to FIGS. 2A, 2B, and 3–5. The more important mechanical aspects of the camera will now be described. The optical system 50, including the Cassegrain optical system, spectrum dividing prism 56, and optical components in the optical paths 58 and 60, are rigidly mounted to a camera housing or superstructure 52. This camera housing 52 takes the form of a pair of opposed, elongate C-shaped frames extending transversely on opposite sides of the roll axis substantially the entire length of the camera. The C-shaped frame members 52 provide a structure in which to mount the various optical and mechanical components of the camera, including the end plates 41 and 41A.

The end plate 41 is bolted to the right hand end of the C-shaped frames 52, as shown in FIG. 3. The rotor portion of the roll motor 70A is in turn bolted to the end plate 41, thereby coupling the rotational portion of the roll motor 70A to the camera frame 52. The stator portion of the roll motor 70A is fixedly coupled to the aircraft frame or pod via two L-shaped brackets 39 and the associated passive isolation mounts (conventional, not shown). The left-hand end of the C-shaped frame 52 is similarly bolted to an end plate 41A, and the rotor portion of the roll motor 70B is bolted to the end plate 41A, with the stator portion bolted to two L-shaped brackets 39. Two roll motors 70A and 70B are conventional frameless DC torque motors, adapted to mount to the camera 36. Two are used in the illustrated embodiment in order supply enough torque to rotate the camera housing 52 and all the attached components, but one motor may suffice if it is powerful enough. In the illustrated embodiment, the roll motors 70A and 70B are frameless DC torque motors, adapted to fit to the camera housing, a task within the ability of persons skilled in the art. The roll motors are described below in further detail in conjunction with FIGS. 12–15.

Figure 7:
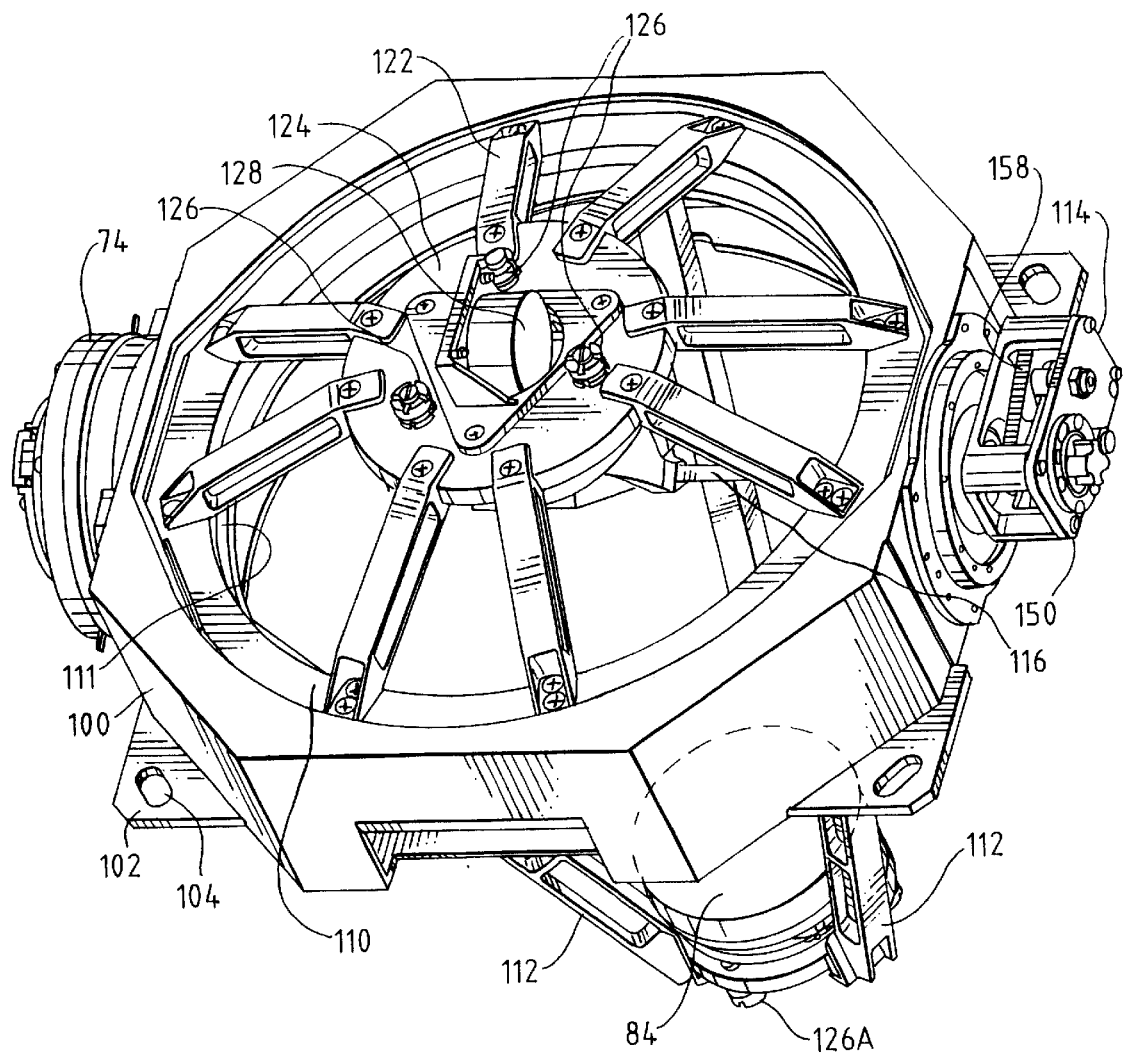
FIG. 7 is another perspective view of the Cassegrain primary mirror retaining assembly of FIG. 6.
Figure 8:
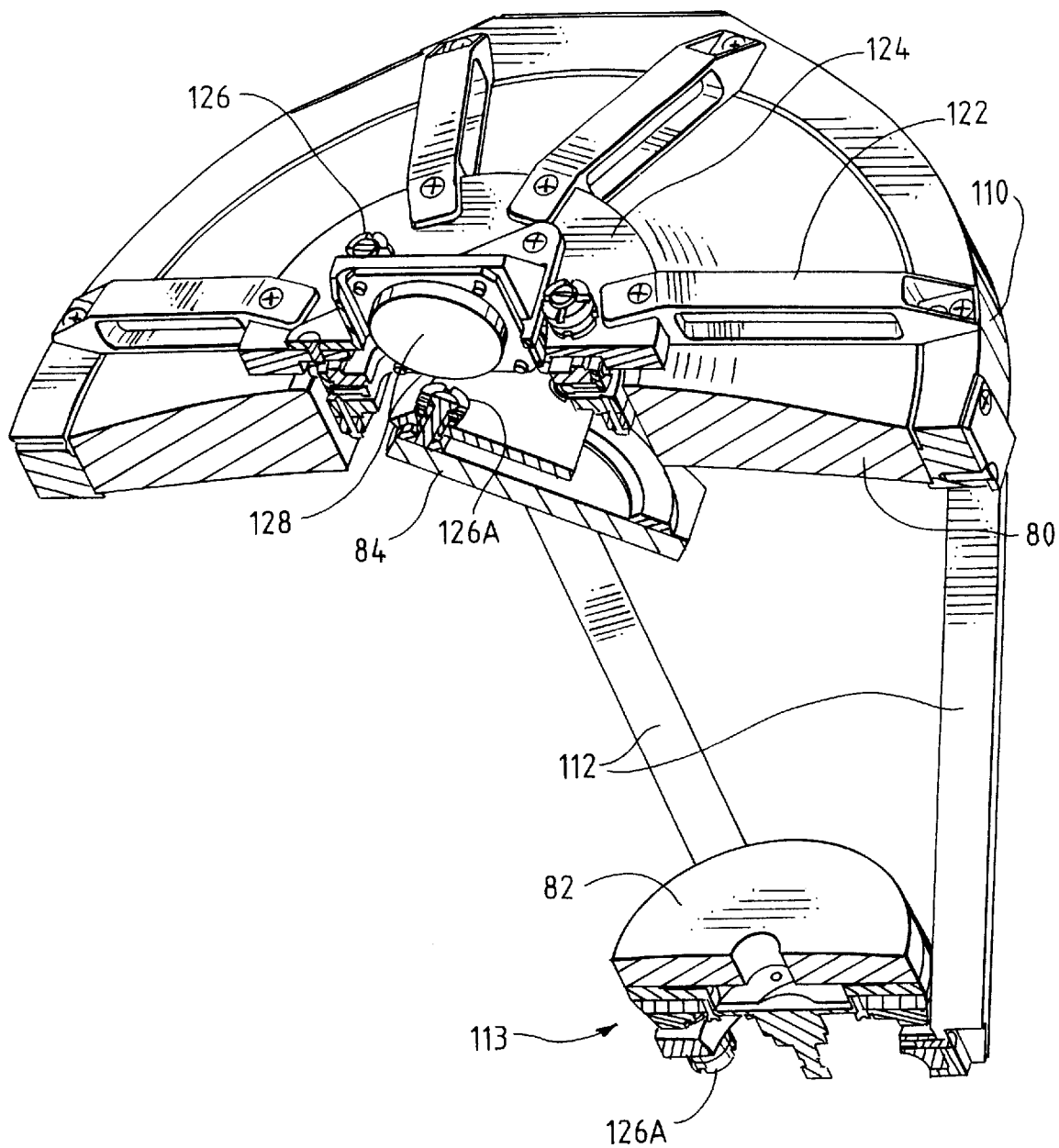
FIG. 8 is another perspective view of the Cassegrain primary mirror retaining assembly as seen generally from the rear, shown partially in section.
Figure 9:
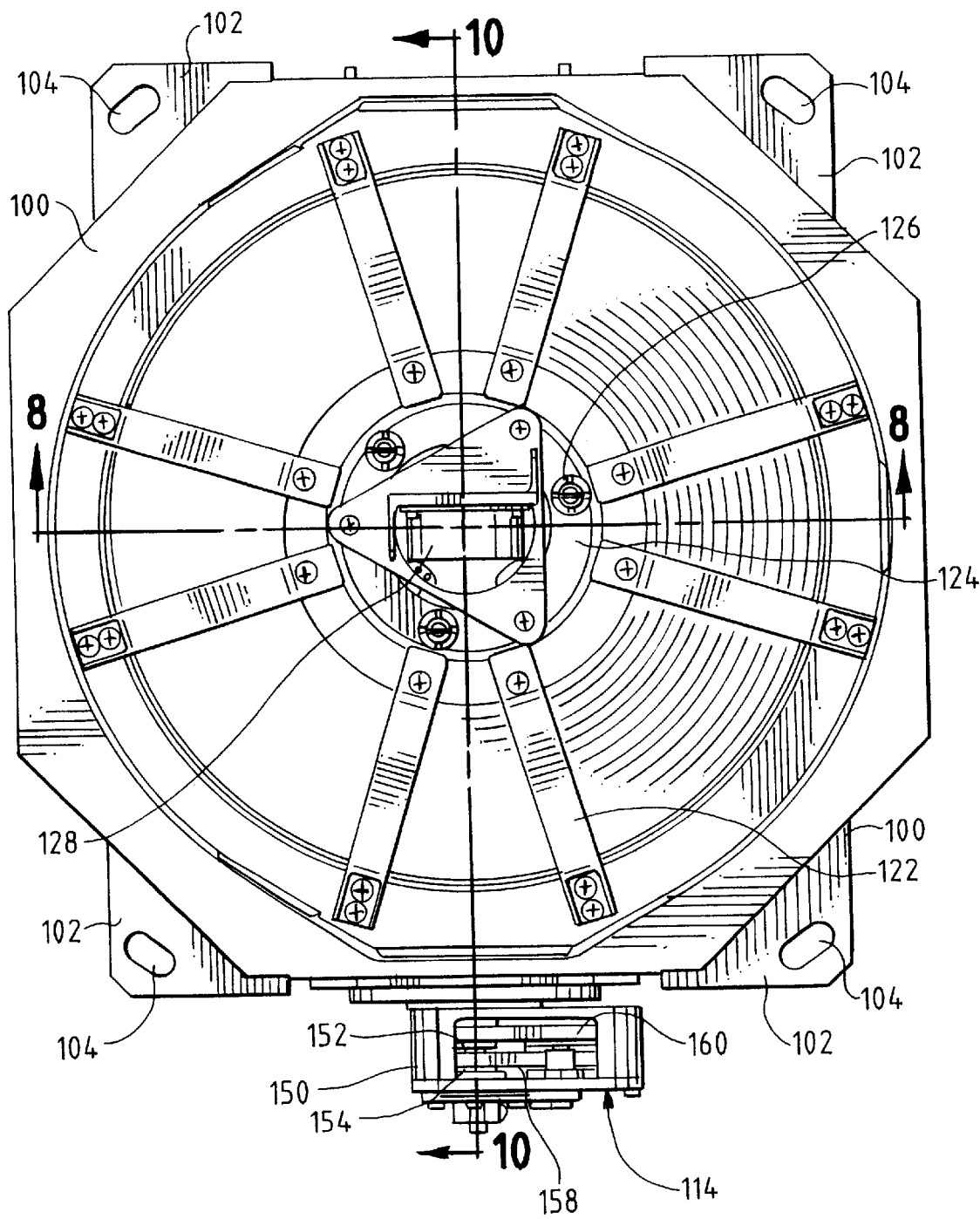
FIG. 9 is a top view of the Cassegrain optical system of FIG. 6.
Figure 10:
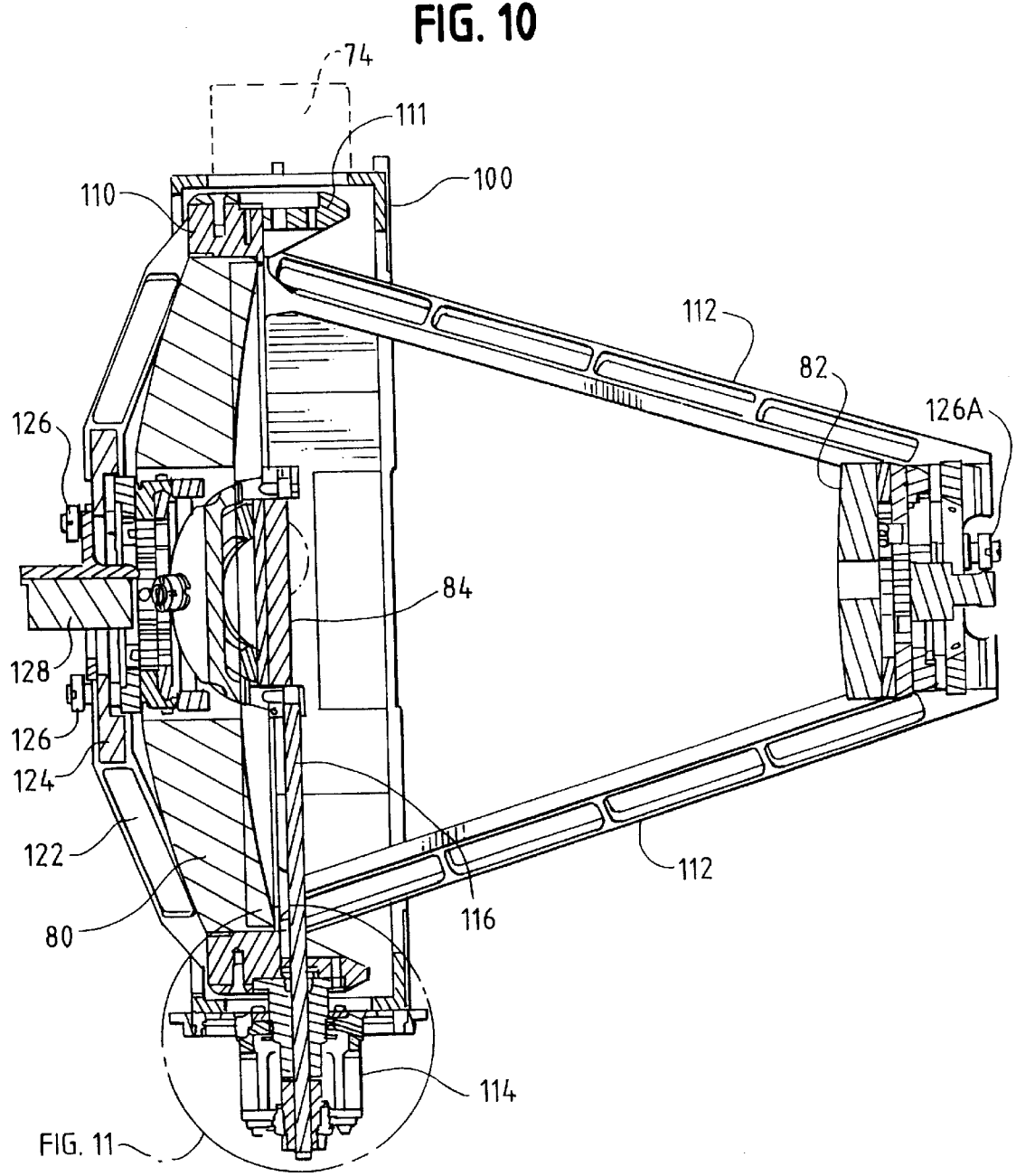
FIG. 10 is a cross-sectional view of the Cassegrain optical system of FIG. 6, taken along the line 10—10 of FIG. 9.

FIG. 3 is a top view of the camera 36, looking towards to the back side of the primary mirror 80. The Cassegrain objective lens optical subassembly 54 includes a primary mirror cell 100 which includes four mounting flanges 102 with bolt holes 104 for mounting via bolts to the top flange 106 of the C-shaped frames 52. The Cassegrain optical system is shown isolated in FIGS. 6–10. In FIGS. 6 and 7, the primary mirror is removed in order to better illustrate the rest of the structure in the Cassegrain optical system.

As is shown best in FIGS. 3 and 6, a spider 120 consisting of eight arms 122 extends between an inner primary mirror holding ring 110 and an azimuth mirror mounting plate 124 located at the center of the primary mirror 80. The mounting plate 124 incorporates three adjustment screws 126 for adjusting the tilt of the azimuth mirror 84. A fiber optic gyroscope 128 is also mounted to the plate 124 and is provided for purposes of inertial stiffness and stabilization of the Cassegrain optical system 50. The secondary mirror assembly 113 includes a set of three adjustment screws 126A for adjusting and aligning the orientation of the secondary mirror relative to the primary mirror.

The stator portion of the Cassegrain motor 74 is fixed with respect to the primary mirror cell 100. The rotor portion of the motor 74 is mounted to an annular ring 111 shown in FIG. 10, which is attached to the inner primary mirror holding ring 110. The secondary mirror 82 is fixed with respect to the primary mirror by means of three arms 112. Thus, the motor 74 rotates both the primary, secondary and azimuth mirrors about axis 75 in the direction of the line of flight in unison. The Cassegrain motor 74 is based on a DC direct drive motor adapted as required to the Cassegrain primary mirror holding structure, again a task within the ability of persons skilled in the art.

The rotation of the inner mirror holding ring 110 by the Cassegrain motor 74 is reduced by a two-to-one reduction tape drive assembly 114, shown best in FIGS. 5, 6 7, 9 and 11. The tape drive assembly 114 rotates an azimuth mirror drive shaft 116 that extends from the tape drive assembly 114 to the azimuth mirror 84. The azimuth tape drive assembly 114 rotates the azimuth mirror drive shaft 116 and thus the azimuth mirror 84 at one half of the rate of rotation of the primary and secondary mirrors by the Cassegrain motor 74.

Figure 11:
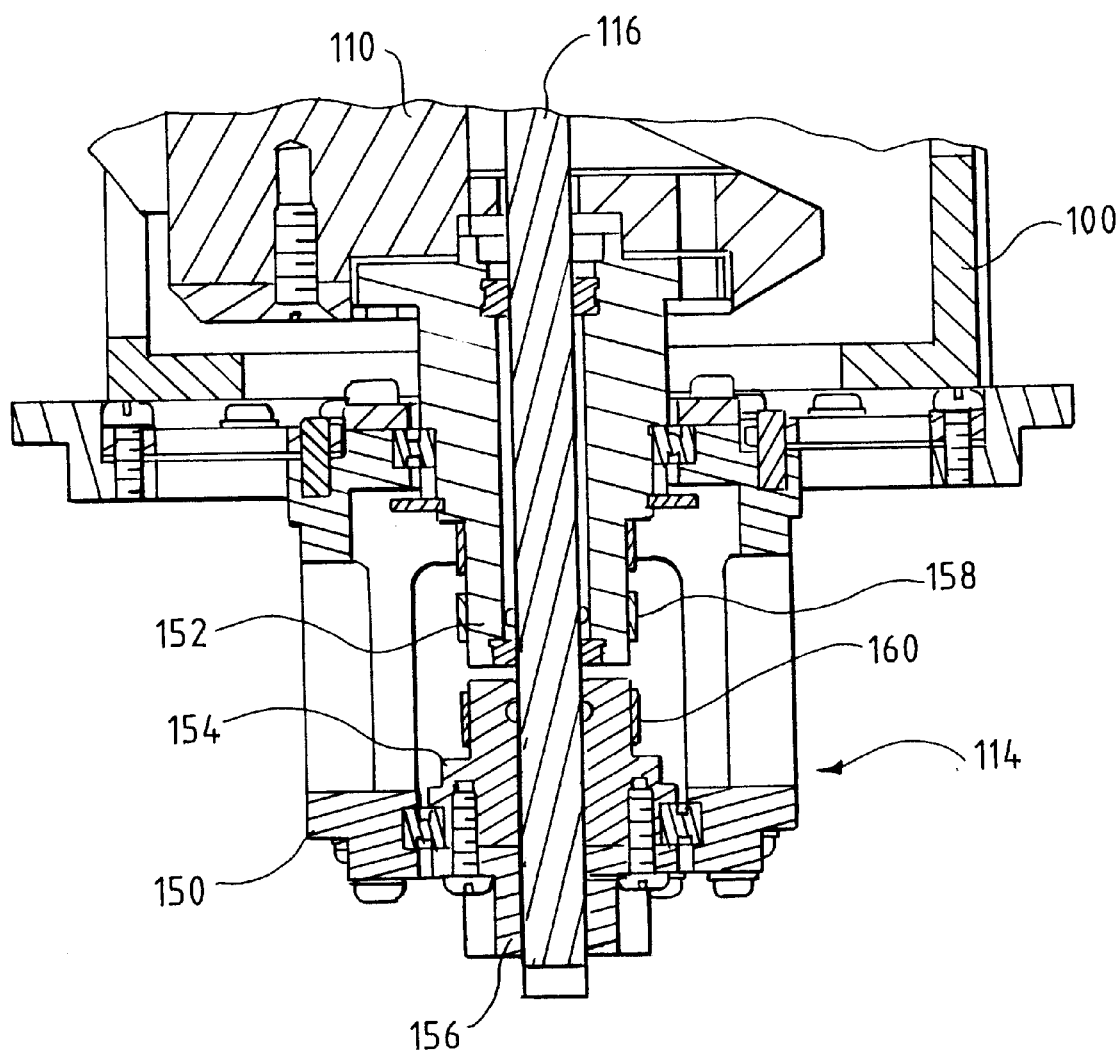
FIG. 11 is a detailed sectional view of the azimuth mirror 2-1 drive assembly that rotates the azimuth mirror at one half the rate of rotation of the entire Cassegrain optical subsystem.

The tape drive assembly 114 includes a two-to-one drive housing 150, two-to-one drive couplings 152 and 154, a shaft locking coupling 156, and a pair of stainless steel tapes 158 and 160, the thickness of which is shown exaggerated in FIG. 11.

Figure 13:
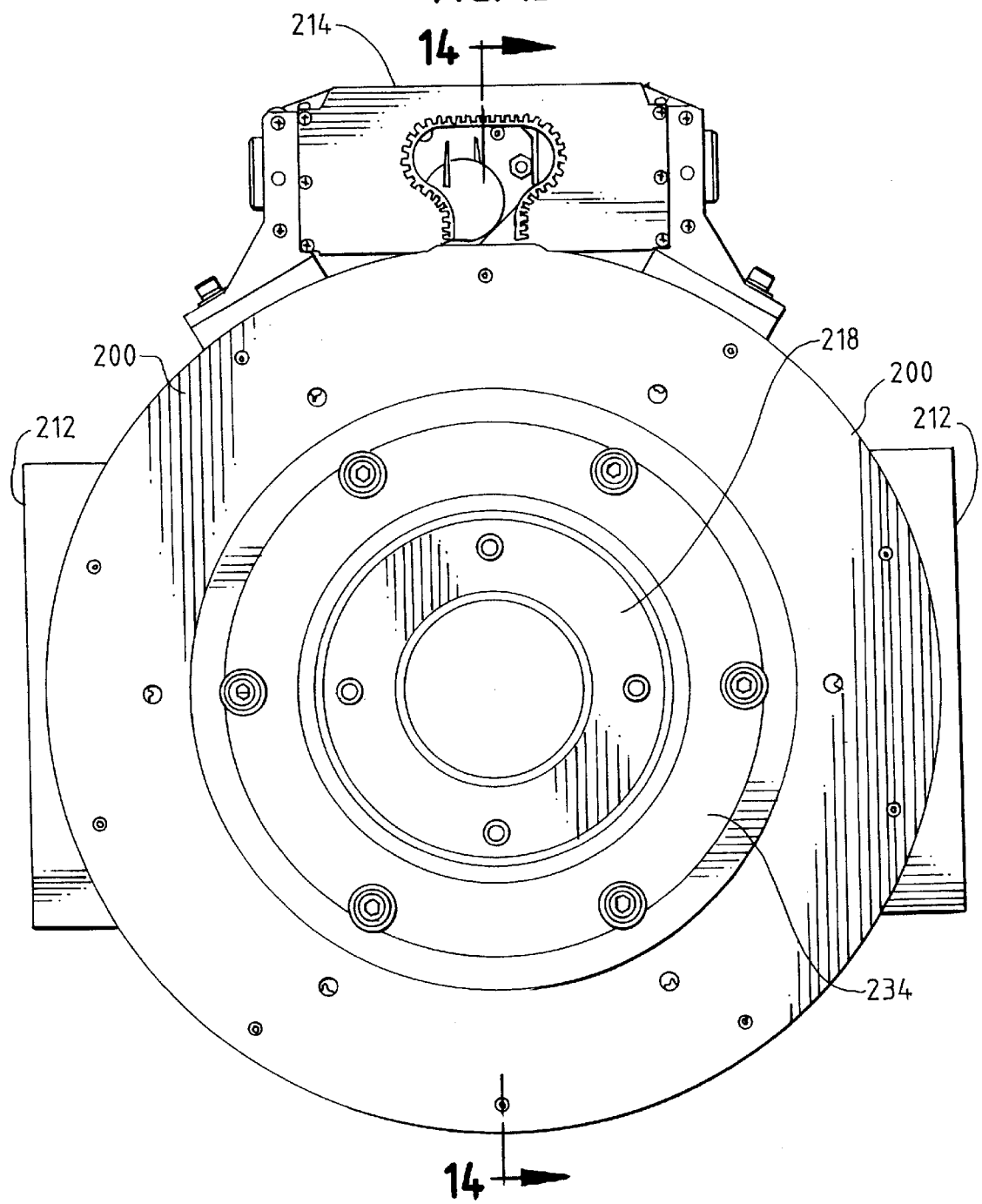
FIG. 13 is an elevational view of the roll motor of FIG. 12.
Figure 14:
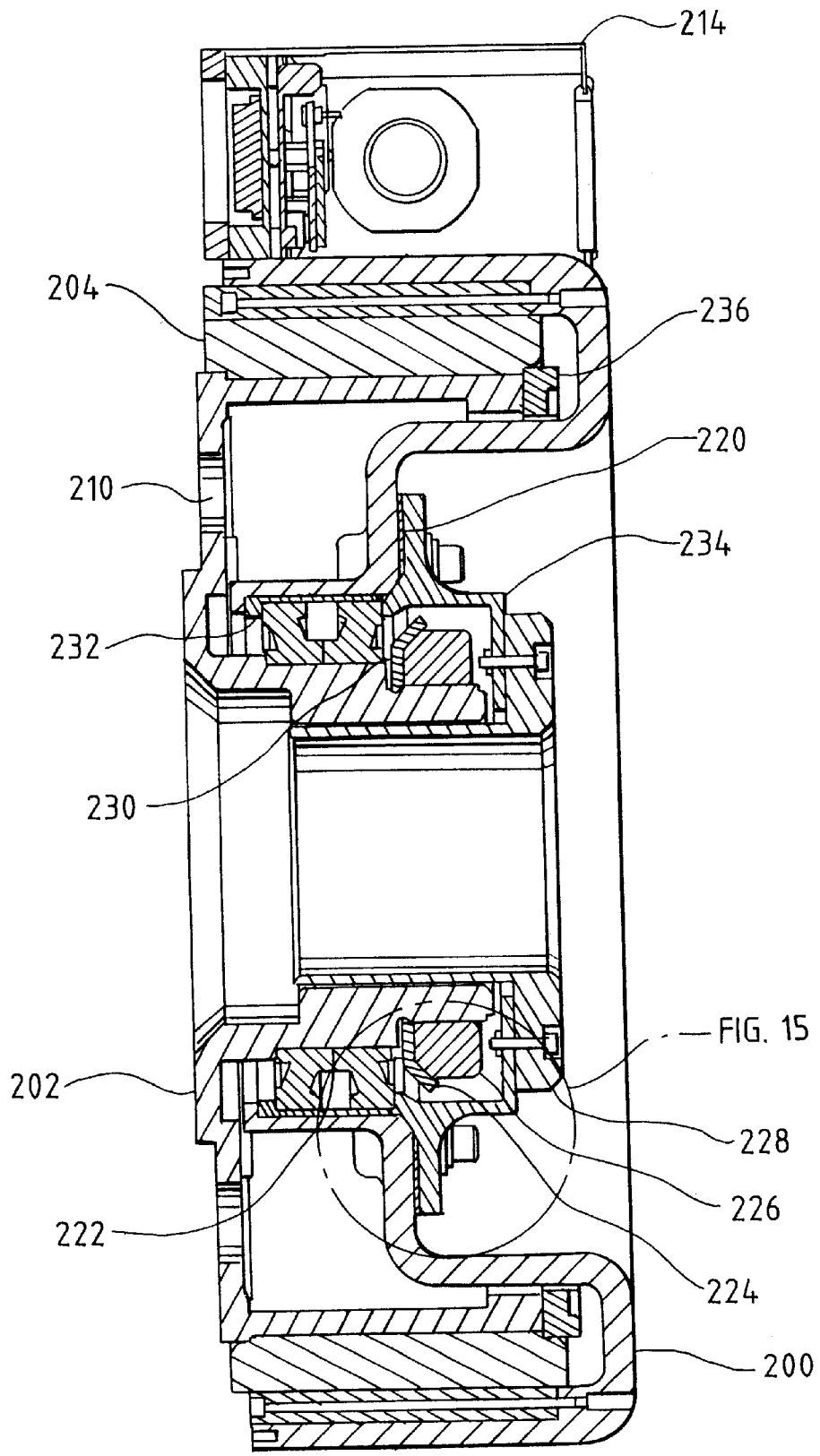
FIG. 14 is a cross-sectional view of the roll motor of FIG. 14.

Referring to FIG. 12, the roll motor 70A is shown isolated from the rest of the camera in a perspective view. FIG. 13 is an elevational view of the motor as seen from the other side. FIG. 14 is a cross-sectional view of the motor 70A. The roll motor 70B is identical to the motor of FIGS. 12–14. Additional details concerning the tape drive assembly 114 are conventional and therefore omitted for the sake of brevity.

The motor 70A includes a trunnion 200, a journal 202 and a DC frameless motor 204. The journal 202 bolts to the plate 41 (FIG. 3) via six bolt holes 208. A set of apertures 210 is provided in the face of the journal 202 to reduce weight. The sides of the trunnion 200 have opposed, parallel flat surfaces 212 with a series of mounting holes for enabling the L-shaped mounting brackets 39 to mount to the trunnion 200 in a plurality of different positions. The motor 70A also includes an electronics module contained in a housing 214. The module includes a power amplifier and associated DC electronic components, which are conventional.

Figure 15:
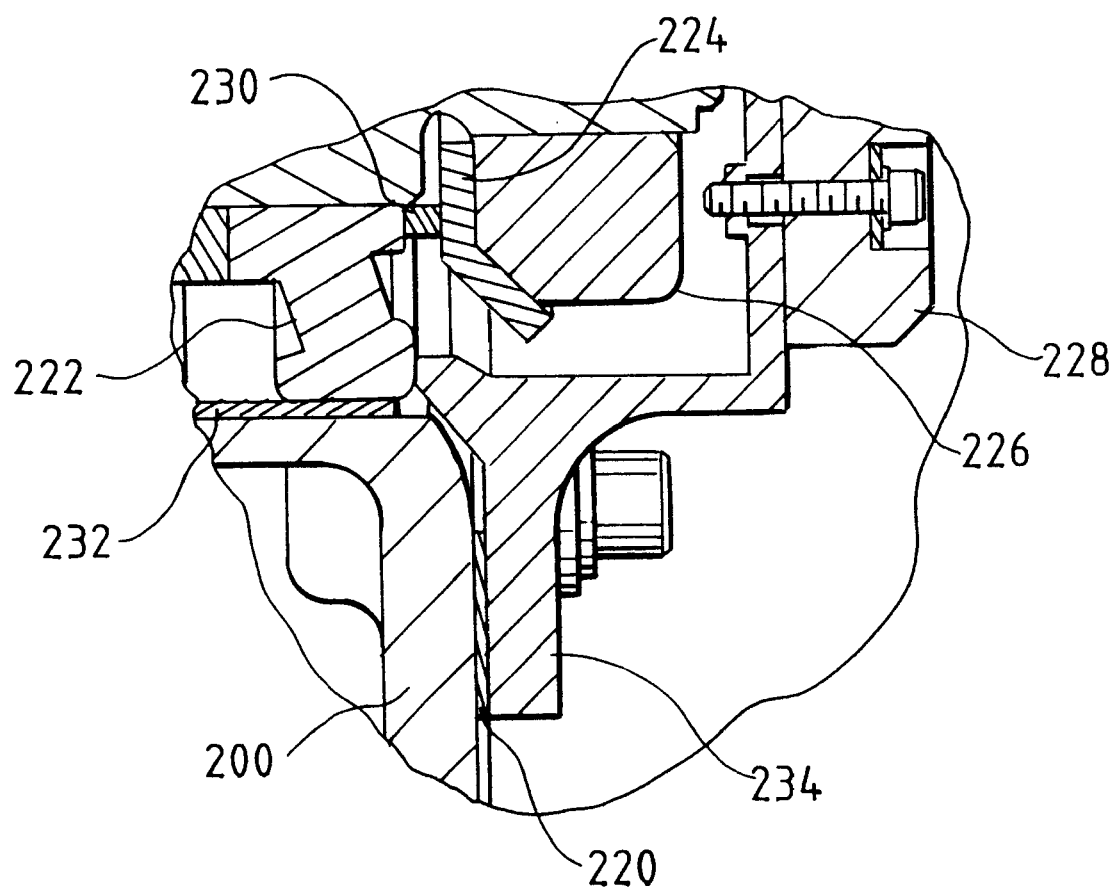
FIG. 15 is a detailed illustration of a portion of the roll motor of FIG. 14.

As shown in the cross-sectional view of FIG. 14, and the detail of FIG. 15, the motor assembly 70A also includes an annular shim 220, an annular bearing 222, a lock washer 224 and locking nut 226, a trunnion sleeve 228, a bearing spacer 930, a bearing insert 232 and a bearing adjustment plate 234. Additional mechanical features shown in FIGS. 14 and 15 are not particularly important and therefore are omitted from the present discussion.

Optical System Detailed Description

The optical system design of the subject camera is driven by the need to illuminate a large focal plane image recording medium and by space constraints, namely the total axial length and the total diameter, which have to be accounted for in potential aircraft installation applications. Thus, while the particular optical design described herein is optimized for a given set of spatial constraints, variation from the illustrated embodiment is considered to be within the scope of the invention.

The optical system 50 of FIGS. 3 and 4 represents a 50-inch, F/4 optical system designed to operate over an extended spectral region. The objective lens module consists of the Cassegrain optical subsystem 54, comprising the primary and secondary mirrors 80 and 82. The azimuth mirror 84 is utilized to redirect the image forming light bundles into the remainder of the optical system, namely the spectrum dividing prism and the relay lenses and other optical components in the optical paths 58 and 60.

Referring now again primarily FIGS. 4, 4A, 4B and 4C, radiation is reflected off the flat azimuth mirror 84 towards a calcium fluoride spectrum-dividing prism 56. An image is formed at a Cassegrain image plane 130 immediately in front of the prism 56. The spectrum-dividing prism 56 is constructed such that radiation in the visible and near IR band (about 0.5 to about 0.9 microns) passes through the prism 56 into the visible/near IR optical path 58 while radiation in the MWIR portion of the spectrum (about 3 to about 5 microns) is reflected upwards through a fold prism 132, made from an infrared transmitting material, into the MWIR optical path 60.

In the visible path, the radiation passes through a relay lens assembly 62 enclosed in a suitable enclosure 134, a focus element 136 adjusting a set of focus lenses 138, and finally to a shutter 88. An image is formed on the focal plane of the image recording medium 64. The shutter 88 opens and closes to control exposure of the visible spectrum image recording medium 64. In the illustrated embodiment, the medium 64 is a charge-coupled device E-O detector, comprising an array of pixels arranged in rows and columns. The array 64 is cooled by a thermo-electric cooler 140. The array and thermo-electric cooler are enclosed in their own housing 142, 14 which includes electronics boards 144 and a set of heat dissipating cooling fans 146.

In the MWIR path, the light passes through a relay lens assembly 66 contained in a suitable housing, through a focus lens assembly 67 and an image is formed at the focal plane of an IR-detecting two dimensional array 68. The MWIR sensor comprises the array 68, a cold stop 69, and an internal filter, all enclosed in a cryogenic dewar 63.

The optical axis of the objective Cassegrain optical subassembly is shown vertical in FIG. 4. This arrangement provides a very compact assembly; if the objective were arranged along a horizontal axis the total length required for the system would have been intolerably large. The use of only reflecting components (catoptric) in the objective allows the collection of light from a very wide spectral region. Such imaging would be impractical or impossible with a refracting objective design.

The point of intersection of the visible relay optical axis and the objective optical axis is an important datum feature of this system. The azimuth mirror 84 reflecting surface is designed to rotate about an axis that contains this intersection point. Furthermore, the entire Cassegrain objective subassembly 54 is arranged to also rotate about this same axis for forward motion compensation. Rotation of the objective permits locking onto ground image detail while the camera and aircraft are moving forward. If the azimuth mirror 84 rotates at half the angular rate of the objective module with respect to the aircraft/camera frame of reference, the selected ground image is effectively locked or frozen onto the detectors. Consequently, the image can be recorded without blur of relative forward motion between the camera and the scene.

Presently preferred embodiments of the subject optical system have focal lengths of between 50 and 100 inches, and an f/number of between 4.0 and 8.0.

Figure 16A:
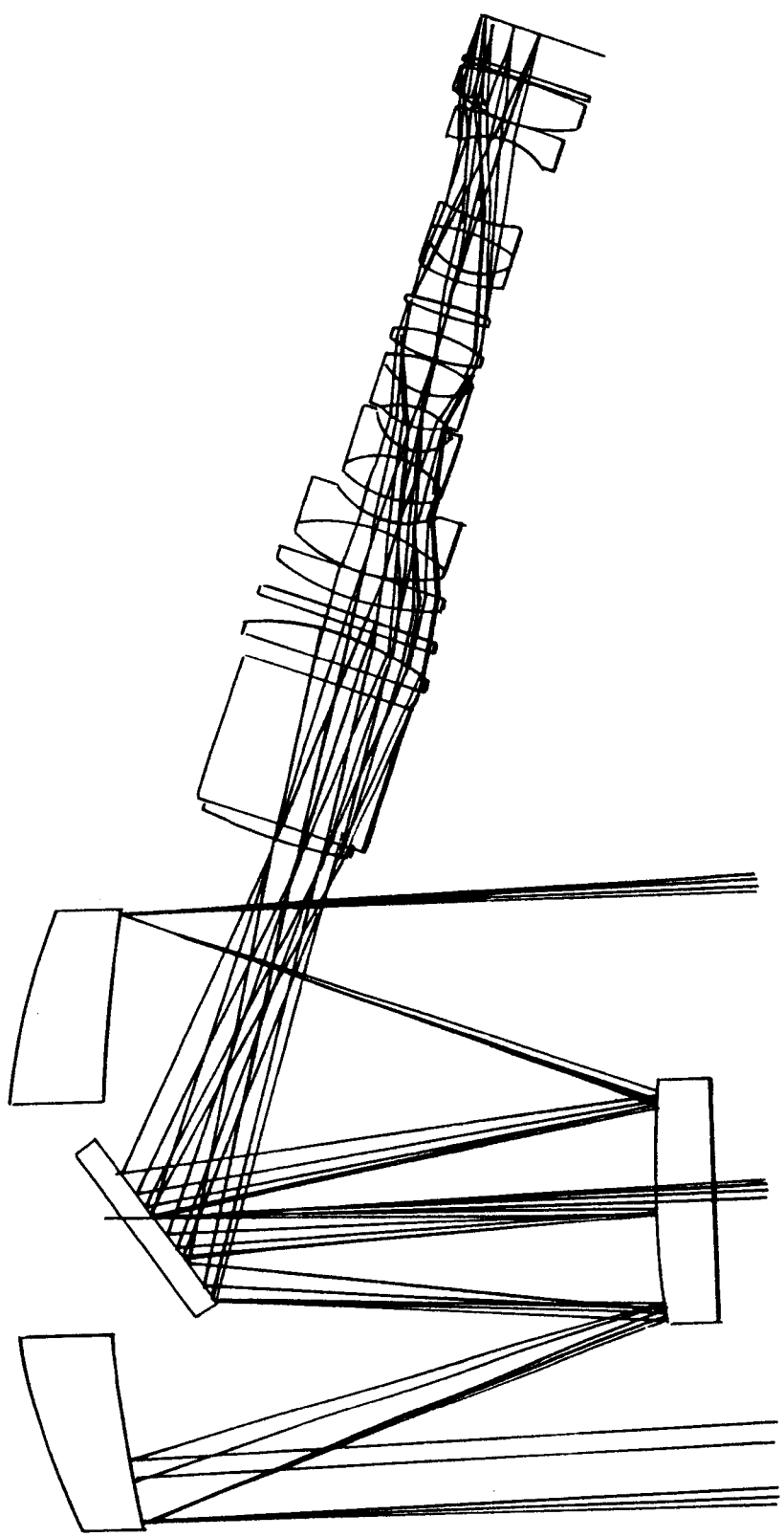
FIG. 16A is a ray diagram of the visible path in the embodiment of FIG. 4.
Figure 16B:
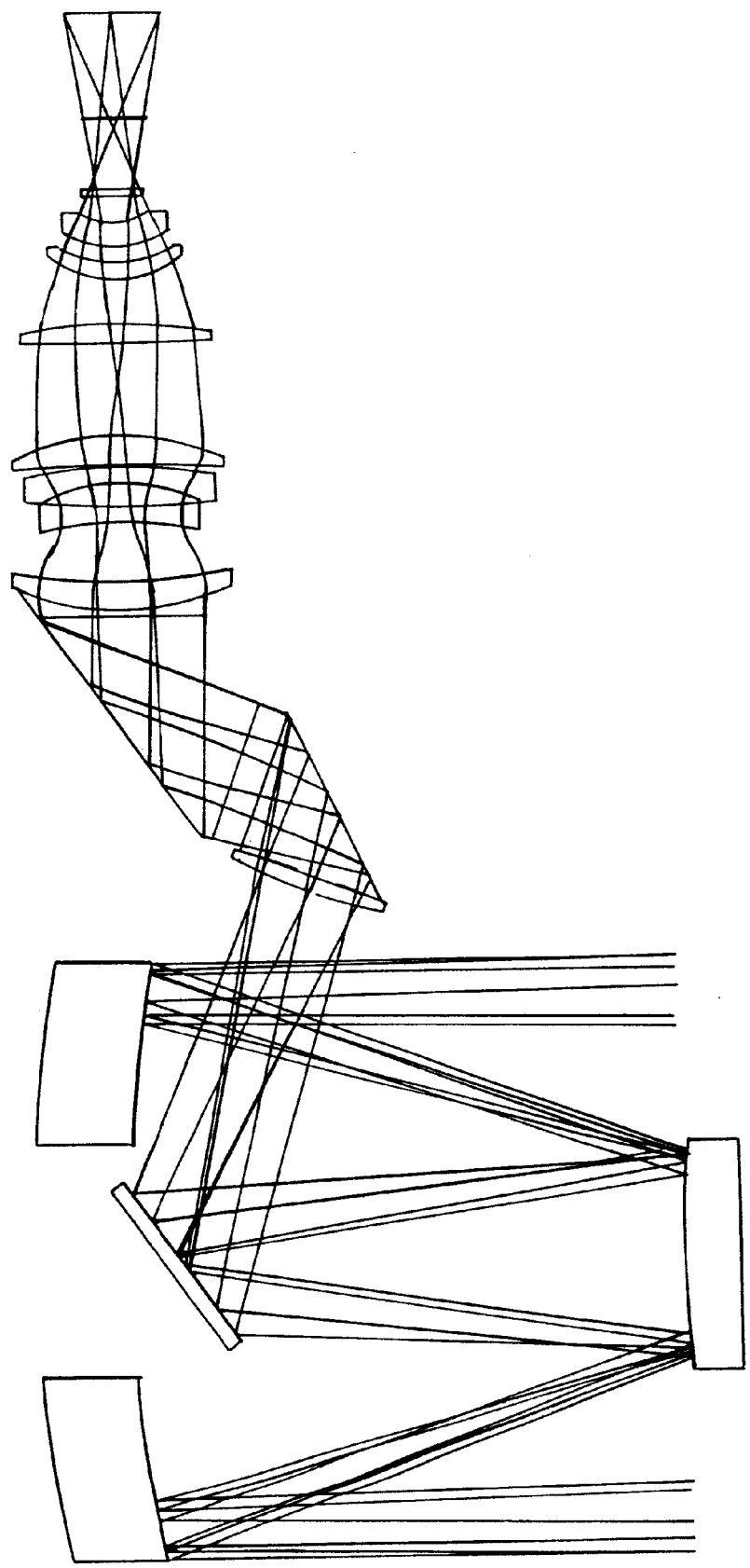
FIG. 16B is a ray diagram of the MWIR path in the embodiment of FIG. 4.
Figure 16C:
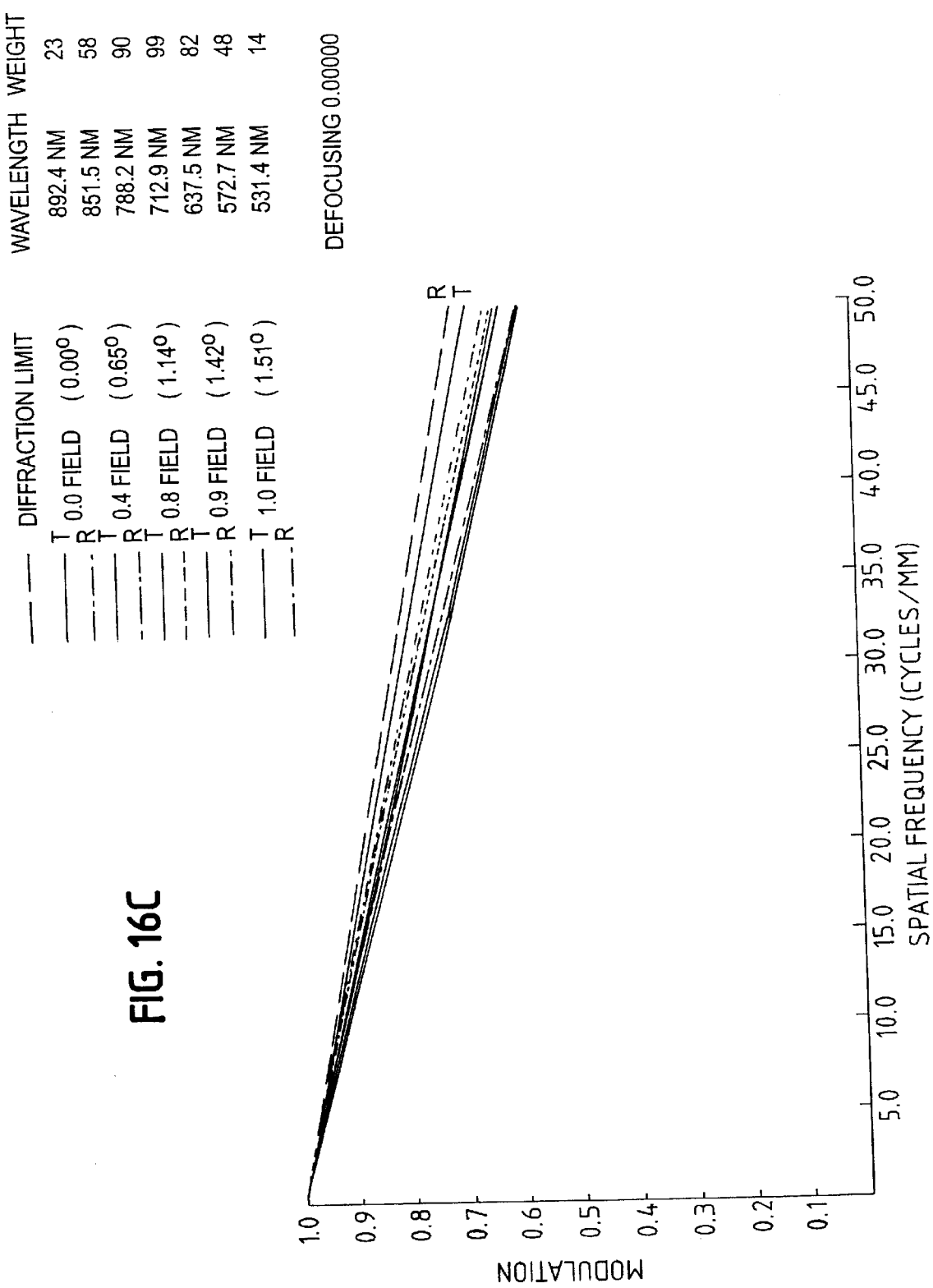
FIG. 16C is a graph of the visible path diffraction modulation transfer function.

FIGS. 16A and 16B are ray diagrams for the visible and MWIR paths of the embodiment of FIG. 4. FIG. 16C is a graph of the diffraction MTF for the visible path. The MTF curves are wavelength-averaged over the visible/IR spectral range of 500 to 900 nm with system spectral weights. The Cassegrain objective subsystem introduces a central obscuration into the light forming beams, and therefore reduces the diffraction-limited performance limits that can be achieved.

In the interest of completeness of the disclosure of the best mode contemplated for practicing the invention, optical prescription, fabrication and aperture data are set forth below in the following tables for the embodiment of FIG. 4. Of course, the data set forth in the tables is by no means limiting of the scope of the invention, and departure thereof is expected in other embodiments of the invention. Furthermore, selection and design of the optical components for any given implementation of the invention is considered to be a matter within the ability of persons skilled in the art of optical design of aerial reconnaissance cameras, with such additional designs being considered obvious modifications of the illustrated embodiment.

In the tables for the visible and MWIR paths, the numbering of the elements in the left-hand column corresponds to the optical elements shown in FIGS. 16A and 16B in progression from the entrance aperture to the detectors.

TABLE 1

VISIBLE PATH PRECRIPTION

FABRICATION DATA
Aug. 30, 2000
Modified 50", F/4 VISIBLE PATH

| ELEMENT NUMBER | RADIUS OF CURVATURE | | THICKNESS | APERTURE DIAMETER | | GLASS |
|---|---|---|---|---|---|---|
| | FRONT | BACK | | FRONT | BACK | |
| OBJECT | INF | | INFINITY*1 | | | |
| | | | | C-1 | | |
| | | | 11.3468 | | | |
| | | | APERTURE STOP | C-2 | | |
| 1 | A(1) | | −11.3468 | C-2 | | REFL |
| 2 | A(2) | | 10.3468 | | 4.8650 | REFL |
| | DECENTER (1) | | | | | |
| 3 | INF | | 0.0000 | C-3 | | REFL |
| | | | | | 3.3525 | |
| | | | −8.2000 | | | |
| 4 | −14.5000 CX | INF | −0.3000 | 2.9916 | 3.0328 | CAF2 |
| | | | −0.0200 | | | |
| 5 | INF | INF | −3.1000 | 3.0382 | 3.6125 | CAF2 |
| | | | −0.4000 | | | |
| 6 | INF | 5.6254 CX | −0.6360 | 3.7191 | 3.7662 | 'F9474/30' |
| | | | −0.2000 | | | |
| 7 | INF | INF | −0.2500 | 3.6228 | 3.5785 | 'OG515' |
| | | | −0.3000 | | | |
| 8 | −5.4347 CX | 33.2980 CX | −0.5926 | 3.4210 | 3.3057 | 'A2334/2' |
| | | | −0.0200 | | | |
| 9 | −4.0545 CX | 3.6785 CX | −0.8920 | 3.0291 | 2.7699 | 'B2601/1A' |
| 10 | 3.6785 CC | −1.4940 CC | −0.2500 | 2.7699 | 2.0369 | '12549414' |
| | | | −0.4633 | | | |
| 11 | −2.1854 CX | 1.4016 CX | −0.8744 | 1.9875 | 1.8522 | '135662/A' |
| 12 | 1.4016 CC | −0.8475 CC | −0.2500 | 1.8522 | 1.4085 | 'B2651/2' |
| 13 | −0.8475 CX | −1.5553 CC | −0.4845 | 1.4085 | 1.3037 | 'A2334/2' |
| | | | −0.3747 | | | |
| 14 | 1.2750 CC | −1.5275 CC | −0.3634 | 1.3029 | 1.6318 | 'B2650/1' |
| 15 | −1.5275 CX | 2.1577 CX | −0.6838 | 1.6318 | 1.7456 | '11646656' |
| | | | −0.0270 | | | |
| 16 | −5.0620 CX | 3.3440 CX | −0.4730 | 1.8086 | 1.8207 | 'A2334/2' |
| | | | −0.4251*2 | | | |
| 17 | −7.5223 CX | 19.2220 CX | −0.1985 | 1.6606 | 1.6522 | 'H9420/8' |
| | | | −0.5725*3 | | | |
| 18 | −2.5775 CX | −1.1718 CC | −0.2500 | 1.6800 | 1.5948 | 'D1741/4' |
| 19 | −1.1718 CX | 2.7961 CX | −0.7869 | 1.5948 | 1.5304 | 'B2601/1A' |
| 20 | 2.7961 CC | −2.2230 CC | −0.2500 | 1.5304 | 1.4526 | 'D1741/4' |
| | | | −1.7614 | | | |
| 21 | 1.4142 CC | 21.3497 CX | −0.3802 | 1.7611 | 2.1914 | 'H9418/35' |
| | | | −0.0245 | | | |
| 22 | −3.4440 CX | 12.7030 CX | −0.8500 | 2.4681 | 2.5450 | 'D1741/6' |
| | | | −0.0500 | | | |
| 23 | INF | INF | −0.0800 | 2.5554 | 2.5603 | BK7 Schott |
| | IMAGE DISTANCE = | | −0.9162 | | | |
| IMAGE | INF | | | 2.6440 | | |

NOTES
Positive radius indicates the center of curvature is to the right
Negative radius indicates the center of curvature is to the left
Dimensions are given in inches
Thickness is axial distance to next surface
Image diameter shown above is a paraxial value, it is not a ray traced value
Other glass suppliers can be used if their materials are functionally equivalent to the extent needed by the design; contact the designer for approval of substitutions.

TABLE 1-continued

VISIBLE PATH PRECRIPTION

APERTURE DATA

| APERTURE | SHAPE | | DIAMETER X | DIAMETER Y | DECENTER X | DECENTER Y | ROTATION |
|---|---|---|---|---|---|---|---|
| C-1 | CIRCLE | | 13.168 | | | | |
| | CIRCLE | (OBSC) | 4.800 | 4.800 | | | |
| C-2 | CIRCLE | (OBSC) | 4.800 | 4.800 | | | |
| | CIRCLE | | 12.600 | 12.600 | | | |
| C-3 | RECTANGLE | | 3.500 | 4.000 | 0.000 | 0.100 | 0.0 |

ASPHERIC CONSTANTS $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

| ASPHERIC | CURV | K | A | B | C | D |
|---|---|---|---|---|---|---|
| A(1) | −0.02881267 | −1.000000 | | | | |
| A(2) | −0.05583473 | −3.928273 | | | | |

DECENTERING CONSTANTS

| DECENTER | X | Y | Z | ALPHA | BETA | GAMMA | |
|---|---|---|---|---|---|---|---|
| D(1) | 0.0000 | 0.0000 | 0.0000 | 35.0000 | 0.0000 | 0.0000 | (BEND) |

TABLE 2

MWIR PRESCRIPTION

FABRICATION DATA
Modified 50", F/4 MWIR LENS 2" Fit to POD Testplates

| ELEMENT NUMBER | RADIUS OF CURVATURE FRONT | RADIUS OF CURVATURE BACK | THICKNESS | APERTURE DIAMETER FRONT | APERTURE DIAMETER BACK | GLASS | |
|---|---|---|---|---|---|---|---|
| OBJECT | INF | | INFINITY*1 | | | | |
| | | | 11.3468 | C-1 | | | |
| 1 | A(1) (Paraboloid) | | −11.3468 | C-2 | | REFL | |
| 2 | A(2) (Ellipsoid) | | 10.3468 | 4.4000 | | REFL | |
| | DECENTER (1) | | | | | | |
| 3 | INF | | −8.2000 | 3.9482 | | REFL | (Azimuth Mirror) |
| 4 | −14.5000 CX | INF | −0.3000 | 3.2080 | 3.2480 | CAF2 | (Field Lens) |
| | | | −0.0200 | | | | |
| 5 | INF | INF | −1.5500 | C-3 | C-4 | CAF2 | |
| | DECENTER (2) | | | | | | CaF2 Prism |
| | INF | | | C-4 | | REFL | |
| | INF | INF | 1.5500 | C-4 | C-5 | CAF2 | |
| | | | 0.6250 | | | | |
| 6 | INF | INF | 2.4000 | C-6 | C-7 | SILICON | |
| | DECENTER (3) | | | | | | Silicon Prism |
| | INF | | | C-7 | | REFL | |
| | INF | INF | −2.5000 | C-7 | C-8 | SILICON | |
| | | | −0.1000 | | | | |
| 7 | −5.2363 CX | −11.8133 CC | −0.6000 | 4.3400 | 4.1700 | SILICON | |
| | | | −1.2602 | | | | |
| 8 | 7.0285 CC | A(3) | −0.3500 | 3.1100 | 3.1800 | GERMMW | |
| | | | −0.4399 | | | | |
| 9 | 3.5768 CC | 10.0404 CX | −0.3500 | 3.2000 | 3.7400 | ZNS | |
| | | | −0.0638 | | | | |
| 10 | 27.0245 CC | 5.1234 CX | −0.6000 | 4.1200 | 4.2400 | SILICON | |
| | | | −1.9286 | | | | |
| 11 | A(4) | 10.1487 CX | −0.4000 | 3.8400 | 3.8200 | ZNS | |
| | | | −0.9223 | | | | |
| 12 | −2.2473 CX | −2.5307 CC | −0.3500 | 2.6700 | 2.4200 | ZNSE | |
| | | | −0.2702*2 | | | | |
| 13 | −2.0677 CX | −1.4306 CC | −0.5000 | 2.1000 | 1.5600 | ZNS | |
| | | | −0.6180*3 | | | | |

TABLE 2-continued

MWIR PRESCRIPTION

| | | | | | | | |
|---|---|---|---|---|---|---|---|
| 14 | INF | INF | −0.1180 | 1.1400 | 1.1400 | SILICON | |
| | | | −0.2290 | | | | |
| | | | APERTURE STOP | | C-9 | | (Cold Stop) |
| | | | −1.2070 | | | | |
| 15 | INF | INF | −0.0400 | C-10 | C-11 | SILICON | |
| | IMAGE DISTANCE = | | −2.1300 | | | | |
| IMAGE | INF | | | 2.8293 | | | |

NOTES
Positive radius indicates the center of curvature is to the right
Negative radius indicates the center of curvature is to the left
Dimensions are given in inches
Thickness is axial distance to next surface
Image diameter shown above is a paraxial value, it is not a ray traced value
Other glass suppliers can be used if their materials are functionally equivalent to the extent needed by the design; contact the designer for approval of substitutions.

APERTURE DATA

| | | | DIAMETER | | DECENTER | | |
|---|---|---|---|---|---|---|---|
| APERTURE | SHAPE | | X | Y | X | Y | ROTATION |
| C-1 | CIRCLE | | 12.633 | | | | |
| | CIRCLE | (OBSC) | 4.800 | 4.800 | | | |
| C-2 | CIRCLE | | 12.500 | 12.500 | | | |
| | CIRCLE | (OBSC) | 4.800 | 4.800 | | | |
| C-3 | RECTANGLE | | 2.900 | 2.900 | (CaF2 Prism - Entrance Face) | | |
| C-4 | RECTANGLE | | 2.900 | 4.101 | (CaF2 Prism - Splitter Face) | | |
| C-5 | RECTANGLE | | 2.900 | 2.900 | (CaF2 Prism - Exit Face) | | |
| C-6 | RECTANGLE | | 3.050 | 3.050 | (Silicon Prism - Entrance Face) | | |
| C-7 | RECTANGLE | | 3.300 | 5.640 | 0.000 | −0.149 | 0.0 |
| C-8 | RECTANGLE | | 3.410 | 3.410 | (Silicon Prism - Exit Face) | | |
| C-9 | CIRCLE | | 0.844 | 0.844 | (Cold Stop) | | |
| | CIRCLE | (OBSC) | 0.320 | 0.320 | (Occulting Disk) | | |
| C-10 | RECTANGLE | | 1.280 | 1.280 | | | |
| C-11 | RECTANGLE | | 1.280 | 1.280 | | | |

ASPHERIC CONSTANTS $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

| ASPHERIC | CURV | K | A | B | C | D |
|---|---|---|---|---|---|---|
| A(1) | −0.02881267 | −1.000000 | | | | |
| A(2) | −0.05583473 | −3.928273 | | | | |
| A(3) | −0.02571678 | 0.000000 | −3.39014E−03 | 3.98460E−04 | −2.25842E−05 | 0.00000E+00 |
| A(4) | −0.02018930 | 0.000000 | 6.40826E−04 | 8.94387E−05 | −1.85905E−05 | 2.93941E−06 |

Electronics System

Figure 17:
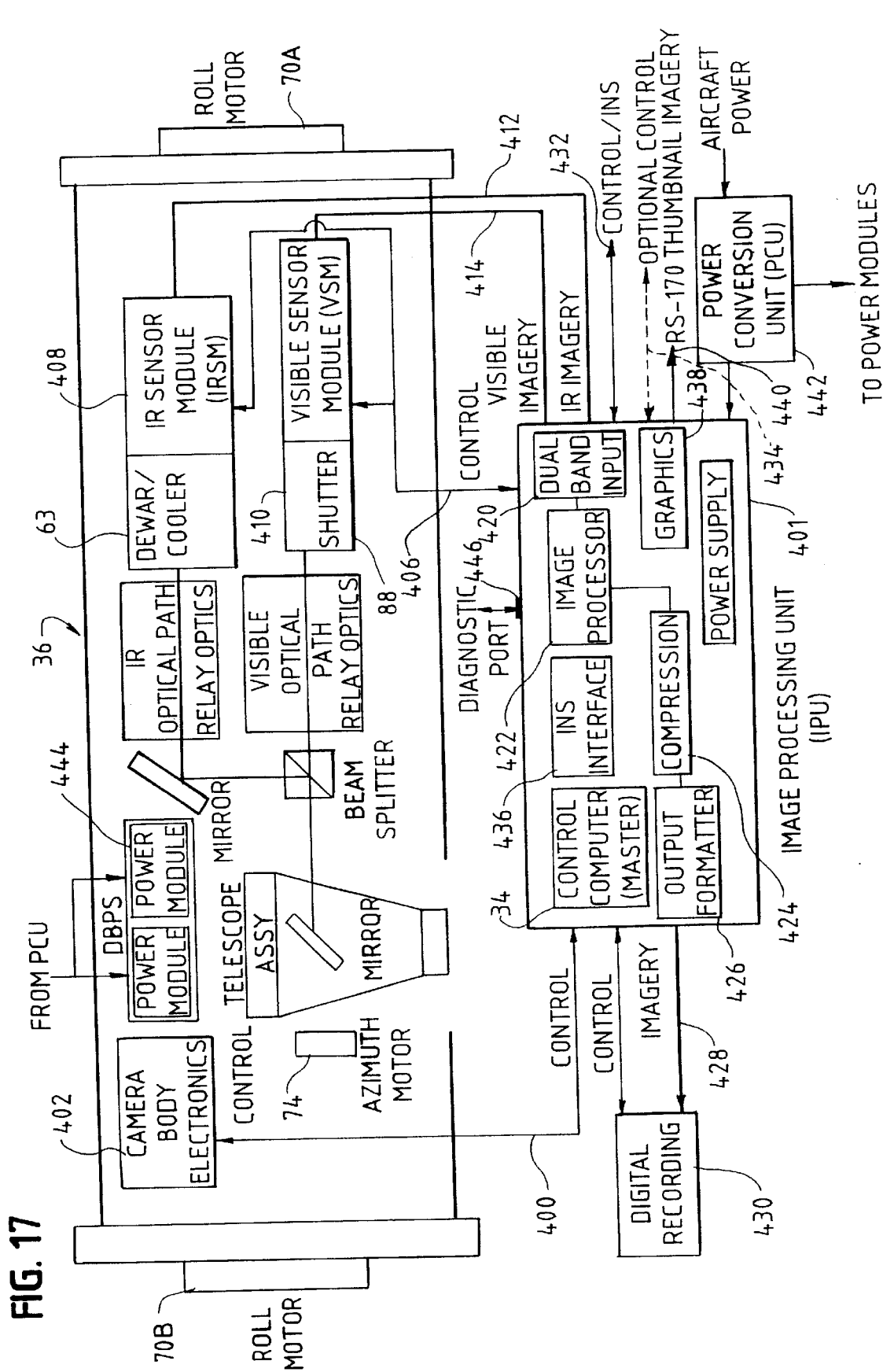
FIG. 17 is a block diagram of the electronics for the camera system of FIGS. 2–5.

The electronics for the camera 36 of FIGS. 1 and 3 is shown in block diagram form in FIG. 17. The electronics includes an image processing unit (IPU) 401 which contains the master control computer 34 of FIG. 1. The master control computer 34 supplies control signals along a conductor 400 to a camera body and stabilization electronics module, represented by block 402. The camera body and stabilization electronics 402 basically includes digital signal processing cards that provide commands to the roll motors 70A and 70B and the Cassegrain or azimuth motor 74 of FIGS. 3, 5 and 6, and receive signals from the stabilization system consisting of the azimuth fiber optic gyroscope 128 mounted on the azimuth mirror and a roll fiber optic gyroscope (not shown) mounted on the camera housing 52. The camera body electronics 402 also receives current roll angle and roll rate data from resolvers in the roll motors 70A and 70B, and from the roll gyroscope, and supplies the roll information to the camera control computer.

The camera control computer 34 also generates control signals, such as start, stop, and counter values, and supplies them via conductor 406 to an IR sensor module (IRSM) 408 and a Visible Sensor Module 410. The IRSM 408 includes a cryogenic dewar or cooler 63, the IR detector 68 (FIG. 4) and associated readout circuitry, and electronic circuitry shown in FIG. 19 and described subsequently for transferring charge through the IR array to achieve roll motion compensation. Pixel information representing IR imagery is read out of the array 68, digitized, and sent along a conductor 412 to the IPU 401. In an alternative embodiment, the electronic circuitry shown in FIG. 19 could be incorporated into the camera body electronics 402 or in the Image Processing Unit 401.

The visible sensor module 410 includes a mechanical shutter 88, a visible spectrum electro-optical detector 64 (FIG. 4) and associate readout registers and electronic circuitry described in FIG. 19 and described subsequently for transferring charge through the visible spectrum detector 64 to achieve roll motion compensation. Pixel information representing visible spectrum imagery is read out of the detector 64, digitized, and sent alone a conductor 414 to the IPU 401.

Visible and IR imagery supplied by the Visible Sensor Module and the IR Sensor Module is received by a dual band input module 420 and supplied to an image processor 422 for purposes of contrast adjustment, filtering, radiometric correction, etc. Typically, images generated by the arrays 64 and 68 are either stored for later retrieval or downlinked to a ground station. In the illustrated embodiment, the imagery is compressed by a data compression module 424, supplied to an output formatter 426 and sent along a conductor 428 to a digital recording module 430 for recording of the imagery on board the aircraft.

Aircraft inertial navigation system data such as aircraft velocity, height, aircraft attitude angles, and possibly other information, is obtained from an aircraft 1553 bus, represented by conductor 432. Operator inputs such as start, stop and roll angle commands from a manual cockpit or camera console or control panel, can also be supplied along the conductor 432 or by an optional control conductor 434. The INS and operator commands are processed in an INS interface circuit 436 and supplied to the camera control computer 34 and used in the algorithms described above. The camera control computer also has a non-volatile memory (not shown) storing fixed parameters or constants that are used in generating the roll motion compensation commands, such as the pixel pitch, array size, master clock rate, and optical system focal length.

The image processor 422 and a graphics module 438 are used to generate thumbnail imagery and supply the imagery to an RS-170 output 440 for viewing in near real time by the operator or pilot on board the reconnaissance vehicle, or for downloading to the ground station. Other format options for the thumbnail imagery are also possible.

Aircraft power is supplied to a power conversion unit 442, which filters, converts and distributes it to two power modules 444. The power modules 444 supply the required AC or DC voltages to the various electronic components in the camera 36.

An RS-232 diagnostic port 446 is provided in the IPU 401 for remote provisioning, diagnostics, and software downloads or upgrades or debugging by a technician. The port 446 provides an interface to the master control computer 34, and the other modules in the IPU 401 and allows the technician to access these units with a general purpose computer. Changes to fixed parameters stored in non-volatile memory, such as a change in the focal length of the camera, are also made via the port 446.

Except as noted herein and elsewhere in this document, the individual modules and components in the electronics are considered to be conventional and therefore can be readily derived be persons skilled in the art. Accordingly, a detailed discussion of the modules per se is omitted from the present discussion.

Roll Motion Compensation

Figure 18:
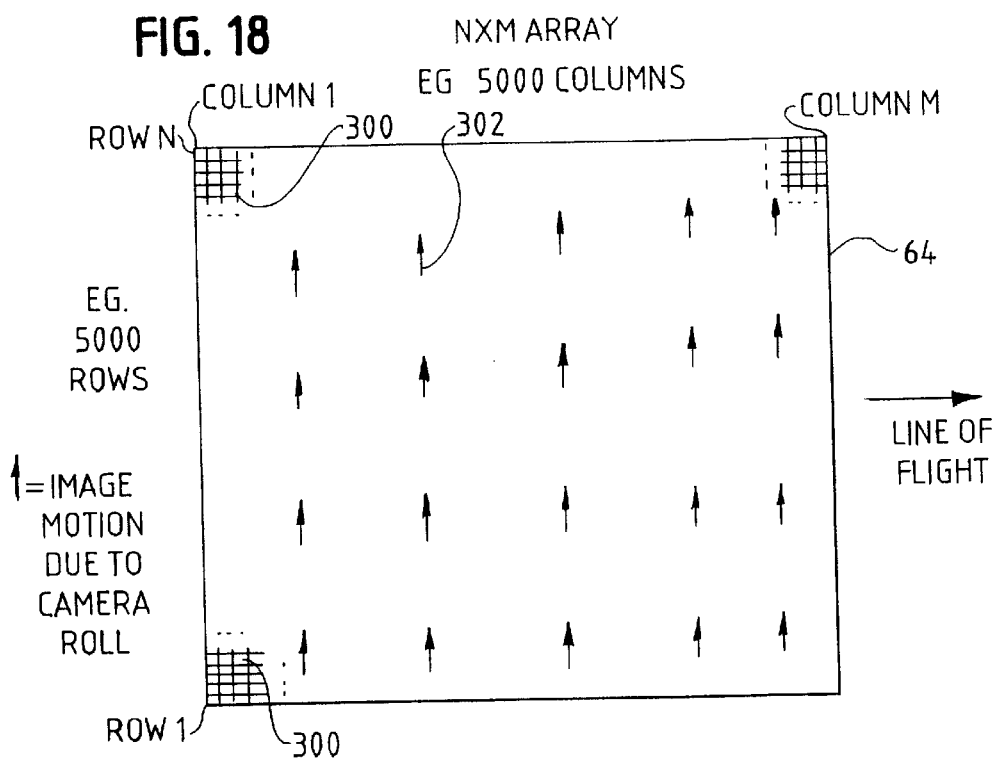
FIG. 18 is schematic representation on an image recording medium in the form of a two dimensional electro-optical array, showing the image motion in the array due to the roll of the camera.

Referring now to FIG. 18, a presently preferred implementation of roll motion compensation in an electro-optical area array detector will now be described. The visible/near IR E-O detector 64 is shown in a plan view. The detector consists of an array of pixel elements 300 arranged in a plurality of rows and columns, with the column direction chosen to be across the line of flight and the row direction in the direction of flight. The array 64 can be any suitable imaging detector including a charge-coupled device, and preferably will comprise at least 5,000 pixels in the row direction and at least 5,000 pixels in the column direction. The illustrated embodiment consists of 5040×5040 pixels, with a 0.010 mm×0.010 mm pixel pitch and a 50.4 mm×50.4 mm array size. The reader is directed to the Lareau et al. U.S. Pat. No. 5,155,597 patent for a suitable detector, however the array need not be organized into column groups as described in the '597 patent and could be configured as a single column group, all columns of pixels clocked at the same rate.

The architecture for the array is not critical, but a full frame imager, as opposed to an interline transfer architecture, is presently preferred. The imager can use either a mechanical shutter or an electronic shutter to expose the array.

The roll motion caused by camera roll motors 70A and 70B produces an image motion indicated by the arrows 302 in the plane of the array 64. The roll motion is in the cross-line of flight direction and the image velocity v is nearly constant throughout the array. The velocity v is equal to the product of the optical system focal length f multiplied by the rate of rotation $\omega$. Since f is fixed (and the value stored in memory for the camera control computer), and the rate of rotation is known by virtue of outputs of the fiber-optic gyroscope 128 or from resolvers in the roll motors, the velocity of the image due to roll can be precisely determined for every exposure. The velocity can be expressed in terms of mm/sec, in terms of rows of pixels per second, or in terms of the fraction of a second it takes for a point in the image to move from one row of pixels to the adjacent row given the known pixel pitch. The pixel information (i.e., stored charge) in the individual pixels 300 is transferred row by row throughout the entire array 64 at the same rate and in the same direction of image motion during the exposure time, thereby avoiding image smear due to the roll motion.

Figure 19:
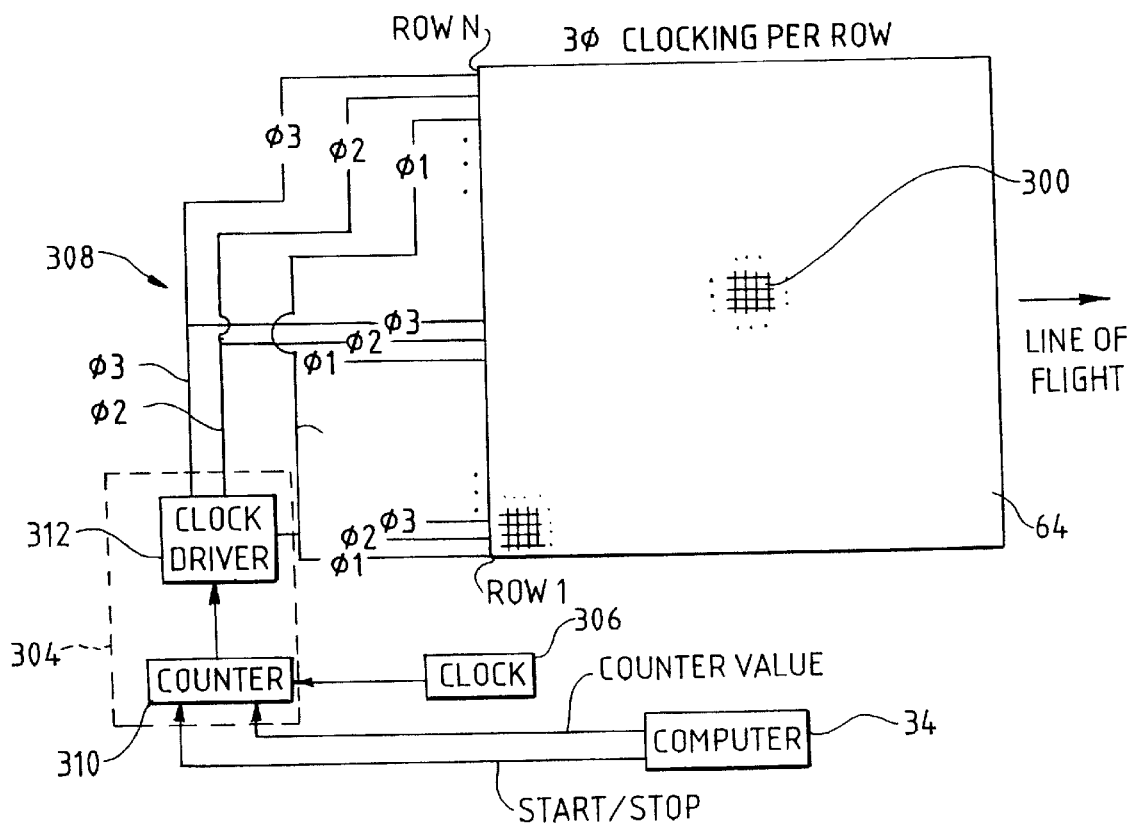
FIG. 19 is another schematic representation of the array of FIG. 18, showing the electronic circuitry that controls the transfer of pixel information in the array at the same velocity as the image in order to provide roll motion compensation.

To accomplish this, and with reference to FIG. 19, the camera electronics includes a counter and clock driver circuit 304 (one for each detector 64, 68) which generates voltage pulses and supplies them to a set of three phase conductors 308 which are coupled to each row of the array. One cycle of three-phase clocking effectuates a transfer of charge from one row to the adjacent row. A master clock 306 generates clock signals at a master clock frequency and supplies them to a counter 310. The camera control computer calculates a counter value which determines the number the counter 310 is supposed to count to at the known master clock rate to time the transfer of charge from one row to another in synchronism with the movement of the image by one row of pixels (0.010 mm). The master computer 34 supplies the counter value to the counter 310, along with a start and stop commands.

At the moment the array 64 is exposed to the scene, the counter 310 starts counting at the clock rate up to the counter value. When the counter value is reached, a trigger signal is sent to a clock driver 312. The clock driver 312 initiates one cycle of three phase clocking on conductors 308, causing the pixel information from row 1 to be transferred to row 2, from row 2 to row 3, etc. When the counter value is reached, the counter 310 resets itself and immediately begins counting again to the counter value, another cycle of clocking is triggered, and the process repeats continuously while the array is exposed and charge is integrated in the detectors. At the end of the exposure period, a stop signal is sent to the counter 310. The pixel information in the array 64 is read out of the array into read-out registers at the bottom of the array (not shown), converted into digital form, and either stored locally on a digital recording medium for later use or transmitted to a remote location such as a base station.

The process described for array 64 is essentially how the IR detector operates as well for accomplishing roll motion compensation. In alternative embodiments, the image motion compensation could be performed in other readout structures depending on the architecture for the array. The IR detector could be sensitive to radiation in the Short Wavelength Infra-Red (SWIR) band (1.0 to 2.5 microns), mid-Wavelength IR (MWIR) band (3.0 to 5.0 microns) or Long Wavelength IR (LWIR) band (8.0 to 14.0 microns). In such an array, the output of the each photosensitive photodiode detector is coupled to a charge storage device, such as a capacitor or CCD structure, and the charge is shifted from one charge storage device to the adjacent charge storage device in synchronism with the image velocity while charge is being integrated in the charge storage devices.

The process of roll motion compensation can be more finely tuned by deriving the rate of rotation ($\omega$) used in the algorithm from the actual inertial rate sensed by a fiber optic gyroscope mounted to the camera housing or frame. Such a gyroscope can count with a resolution of 1 microradian or better. The gyroscope generates a signal that is supplied to a DSP card in the camera control electronics module 402 (FIG. 17). A signal could also be constructed for imaging array clocking purposes in the form of a pulse train which the imaging array clock generator could phase lock to. By doing this, any rate inaccuracy or stabilization shortcomings associate with the roll motion could be overcome. The roll motion compensation becomes, in effect, a fine stabilization system which removes the residual error from the more coarse electro-mechanical stabilization system. Having a fine system, based on a closed loop feedback from the roll fiber optic gyroscope, would allow for a larger range of roll motion without image degradation.

The above-described roll motion compensation will produce some minor edge effects at the bottom of the array, which are typically ignored since they are a very small fraction of the image generated by the array.

Other Embodiments

As noted above, the principles of roll framing and forward motion compensation described above are applicable to a camera that images in a single band of the electromagnetic spectrum. In such an embodiment, the spectrum dividing prism would not be needed and the objective optical subassembly (Cassegrain or otherwise) would direct the radiation in the band of interest to a single optical path having a photo-sensitive image recording medium placed herein. The spectrum dividing prism and second optical channel are not needed. Otherwise, the operation of the camera in roll framing and spot modes of operation would be the same as described above.

As another alternative embodiment, three or more detectors could image the three or more bands of the electromagnetic spectrum simultaneously. In such an embodiment, an additional spectrum separating prism would be placed in either the visible or IR paths to further subdivide the incident radiation into the desired bands and direct such radiation into additional optical paths, each with its own photo-sensitive image recording medium. As an example, the visible/near IR band could be divided into a sub 700 nanometer band and a 700 to 1000 nanometer band, each associated with a distinct optical path and associated image forming and focusing lenses and an image recording medium. Meanwhile, the IR portion of the spectrum could be similarly divided into two separate bands, such as SWIR, MWIR, and/or LWIR bands, and each band associated with a distinct optical path and associated image forming and focusing lenses and an image recording medium. Obviously, in such an embodiment the arrangement of optical components in the camera housing will be different from the illustrated embodiment due to the additional spectrum dividing prisms, additional optical paths and optical components, and additional detectors. However, persons skilled in the art will be able to make such a modification from the illustrated embodiment using routine skill.

As yet an another possible embodiment, the camera may be designed for hyperspectral imaging. In such an embodiment, one of the optical paths may be devoted to visible spectrum imaging, while the other path is fitted with a spectroradiometer, an imaging spectrometer, or spectrograph to divide the incident radiation into a large number of sub-bands in the spectrum, such as 50 of such sub-bands. Each sub-band of radiation in the scene is imaged by the to hyperspectral imaging array.

As yet another alternative, the camera could be mounted transverse to the roll axis of the aircraft. Such a camera could be used for dual spectrum, full framing imaging in a forward oblique mode, either in a spot mode of operation or in a mode in which overlapping frames of images are generated in a forward oblique orientation.

As yet another alternative embodiment, the smooth roll motion and roll motion compensation feature could be adapted to a step framing camera, such as the KS-127A camera or the step frame camera of the Lareau et al. patent, U.S. Pat. No. 5,668,593. In this embodiment, the roll motors are coupled to the step frame scan head assembly, and continuously rotate the scan head about the roll axis in a smooth, continuous fashion. The detector array and associated relay and focusing optical elements remain stationary with respect to the aircraft. The image acquired by the scan head assembly would need to be derotated with a pechan prism, K mirror or other suitable element, as described in the '593 patent. Roll motion compensation would be performed electronically in the array, as described at length above.

As a variation on the above embodiment, the roll motors are coupled to the step frame scan head and continuously rotate the step frame scan head assembly, while the image derotation is achieved by rotation of the imaging array in synchronism with the rotation of the scan head assembly. Roll motion compensation is achieved by transferring pixel information in the array at substantially the same rate as the rate of image motion due to scan head rotation.

Less preferred embodiments of the invention include other types of optical arrangements. While the catoptric Cassegrain optical system is the preferred embodiment, refractive optical systems, catadioptric optical systems, and still other types of optical arrangements may be used, for example where only single spectrum imaging is performed, where space requirements are not so important, or when other considerations dictate that a different type of optical arrangement for the objective lens is suitable. In such embodiments, the optical subassembly comprising the objective lens would be rotated in the direction of flight to accomplish forward motion compensation as described above, while the entire camera housing including the objective lens is rotated about an axis to thereby generate sweeping coverage of the field of interest, either about the roll axis or about an axis perpendicular to the roll axis.

Presently preferred and alternative embodiments of the invention have been described with particularity. Considerable variation from the disclosed embodiments is possible without departure from the spirit and scope of the invention. For example, the type and structure of the image recording medium is not critical. The details of the optical design, the mechanical system and the electronics may vary from the illustrated, presently preferred embodiments. This true scope and spirit is to be determined by the appended claims, interpreted in light of the foregoing.

What is claimed is:

1. A dual band framing aerial reconnaissance camera for installation in an airborne vehicle, comprising;
    (a) a camera housing;
    (b) an optical system incorporated into said camera housing, comprising:
        (1) an objective optical subassembly for receiving incident radiation from a scene external of said vehicle;
        (2) a spectrum dividing element receiving radiation from said objective optical subassembly, said element directing radiation in a first band of the electromagnetic spectrum into a first optical path and directing radiation in a second band of the electromagnetic spectrum into a second optical path different from said first optical path;
        (3) a first two-dimensional image recording medium in said first optical path for generating frames of imagery in said first band of the electromagnetic spectrum; and
        (4) a second two-dimensional image recording medium in said second optical path for generating frames of imagery in said second band of the electromagnetic spectrum;
    (c) a first motor system coupled to said camera housing capable of rotating said camera about a first axis,
    wherein said first and second image recording media are exposed to said scene to generate frames of imagery in said first and second bands of said electromagnetic spectrum as said first motor system steps said camera in a series of steps about said first axis.

2. The camera of claim 1, further comprising a second motor system coupled to said objective optical subassembly, said second motor system rotating said objective optical subassembly about a second axis in the direction of forward motion of said vehicle to compensate for forward motion of said aerial reconnaissance vehicle.

3. The camera of claim 1, wherein said first image recording medium comprises an electro-optical detector sensitive to radiation in the infrared portion of the electromagnetic spectrum.

4. The camera of claim 3, wherein said detector sensitive to radiation in the infrared portion of the electromagnetic spectrum is sensitive to radiation having a wavelength of between 1.0 and 2.5 microns.

5. The camera of claim 3, wherein the detector sensitive to radiation in the infrared portion of the electromagnetic spectrum is sensitive to radiation having a wavelength of between 3.0 and 5.0 microns.

6. The camera of claim 3, wherein the detector sensitive to radiation in the infrared portion of the electromagnetic spectrum is sensitive to radiation having a wavelength of between 8.0 and 14.0 microns.

7. The camera of claim 1, wherein one of said image recording media comprises an electro-optical detector sensitive to radiation in the visible portion of the electromagnetic spectrum and wherein the other of said image recording media comprises an electro-optical detector sensitive to radiation in the infrared portion of the electromagnetic spectrum.

8. The camera of claim 1, wherein one of said image recording media comprises an electro-optical detector sensitive to radiation in the visible portion of the electromagnetic spectrum and wherein the other of said image recording media comprises an electro-optical detector sensitive to radiation in the ultraviolet portion of the electromagnetic spectrum.

9. The camera of claim 1, wherein one of said image recording media comprises an electro-optical detector sensitive to radiation in the ultraviolet portion of the electromagnetic spectrum and wherein the other of said image recording media comprises an electro-optical detector sensitive to radiation in the infrared portion of the electromagnetic spectrum.

10. The camera of claim 1, wherein said objective optical assembly further comprises:
    a Cassegrain optical system having a primary mirror, a secondary mirror and an azimuth mirror,
    a motor having a first portion fixed with respect to said camera housing and a movable portion coupled to said primary mirror,
    wherein said motor rotates said primary mirror and said secondary mirror about an axis in the direction of flight at a rate substantially equal to V/R, wherein V comprises the forward velocity of the vehicle and R comprises the range to the scene of interest or an approximation of said range;
    and wherein said azimuth mirror is rotated about an axis in the direction of flight at a rate substantially equal to ½ V/R.

11. The method of claim 1, wherein said first and second image recording media comprise electro-optical imaging detectors and wherein forward motion compensation for said electro-optical imaging detectors is performed electronically in said imaging detectors is performed on chip.

12. The method of claim 11, wherein said objective optical subassembly comprises a Cassegrain optical system having a primary mirror, a secondary mirror and an azimuth mirror.

13. The method of claim 12, wherein said Cassegrain optical system further comprises a motor rotating said primary and secondary mirrors for pointing said camera.

14. The method of claim 1 wherein both said first and second image recording media comprise electro-optical detectors sensitive to radiation in the infrared portion of the electromagnetic spectrum.

15. The method of claim 1, wherein said first image recording media comprises a hyperspectral imaging system.

16. The method of claim 15, wherein said second image recording media comprises an electro-optical detector sensitive to radiation in the visible portion of the spectrum.

* * * * *